United States Patent
Zemenchik

(10) Patent No.: US 12,103,681 B2
(45) Date of Patent: Oct. 1, 2024

(54) AERIAL MONITORING SYSTEM FOR AGRICULTURAL EQUIPMENT

(71) Applicant: CNH Industrial America LLC, New Holland, PA (US)

(72) Inventor: Robert A. Zemenchik, Fair Oaks, CA (US)

(*) Notice: Subject to any disclaimer, the term of this patent is extended or adjusted under 35 U.S.C. 154(b) by 447 days.

(21) Appl. No.: 17/294,994

(22) PCT Filed: Jul. 17, 2019

(86) PCT No.: PCT/US2019/042275
§ 371 (c)(1),
(2) Date: May 18, 2021

(87) PCT Pub. No.: WO2020/023269
PCT Pub. Date: Jan. 30, 2020

(65) Prior Publication Data
US 2022/0348322 A1 Nov. 3, 2022

Related U.S. Application Data

(60) Provisional application No. 62/769,338, filed on Nov. 19, 2018, provisional application No. 62/703,220, filed on Jul. 25, 2018.

(51) Int. Cl.
*B64C 39/02* (2023.01)
*A01B 69/04* (2006.01)
(Continued)

(52) U.S. Cl.
CPC ............ *B64C 39/024* (2013.01); *B64D 47/00* (2013.01); *G05D 1/101* (2013.01); *A01B 69/008* (2013.01);
(Continued)

(58) Field of Classification Search
CPC .. B64C 39/024; B64D 47/00; B64U 2101/30; B64U 2201/20; G05D 1/101; G05D 1/0094; A01B 69/008; A01B 76/00
See application file for complete search history.

(56) References Cited

U.S. PATENT DOCUMENTS 7,571,081 B2    8/2009  Faulknr et al.
9,609,288 B1    3/2017  Richman et al.
(Continued)

FOREIGN PATENT DOCUMENTS

EP    3150037    4/2017
EP    3312095    4/2018
(Continued)

OTHER PUBLICATIONS

Commercial Drones Market 2017 Global Trend Segmentation and Opportunities Forecast to 2022, M2 Presswire, Jul. 12, 2017, 10 pgs, Normans Media Ltd.
(Continued)

*Primary Examiner* — Ig T An
*Assistant Examiner* — Christine Nguyen Huynh
(74) *Attorney, Agent, or Firm* — Rebecca Henkel; Peter K. Zacharias; Rickard K. DeMille

(57) ABSTRACT

An aerial monitoring system includes a base station having a controller and a user interface. The controller is configured to receive a first signal from an unmanned aerial vehicle (UAV) indicative of a point cloud corresponding to a target object on a target agricultural tool. The controller is also configured to compare the point cloud to a model of the target object in a reference unworn state and to determine a state of wear of the target object based on the comparison. In addition, the controller is configured to determine an estimated cost to repair or replace the target object and/or a value of the target agricultural tool based on the state of wear
(Continued)

of the target object. The controller is also configured to instruct the user interface to present the estimated cost to repair or replace the target object and/or the value of the target agricultural tool.

18 Claims, 5 Drawing Sheets

(51) Int. Cl.
  *B64D 47/00* (2006.01)
  *B64U 101/30* (2023.01)
  *G05D 1/00* (2024.01)

(52) U.S. Cl.
  CPC ...... *B64U 2101/30* (2023.01); *B64U 2201/20* (2023.01)

(56) References Cited

U.S. PATENT DOCUMENTS

| | | | |
|---|---|---|---|
| 9,667,710 | B2 | 5/2017 | Wilbur et al. |
| 9,704,292 | B2 | 7/2017 | Priest et al. |
| 2014/0316614 | A1 | 10/2014 | Newman |
| 2016/0019560 | A1 | 1/2016 | Benkert et al. |
| 2016/0050840 | A1 | 2/2016 | Sauder et al. |
| 2016/0073573 | A1 | 3/2016 | Ethington et al. |
| 2016/0237640 | A1* | 8/2016 | Carpenter ................. E02F 9/26 |
| 2016/0253595 | A1 | 9/2016 | Mathur et al. |
| 2017/0068246 | A1* | 3/2017 | Zang .................... G05D 1/0088 |
| 2017/0208151 | A1 | 7/2017 | Gil et al. |
| 2018/0338422 | A1* | 11/2018 | Brubaker ........... A01D 41/1208 |
| 2019/0258271 | A1* | 8/2019 | Sporrer ................ A01B 59/065 |

FOREIGN PATENT DOCUMENTS

| | | |
|---|---|---|
| IN | 5037CH2014 | 9/2015 |
| WO | 2016123201 | 8/2016 |
| WO | 2017075700 | 5/2017 |
| WO | 2019109191 | 6/2019 |

OTHER PUBLICATIONS

Application No. PCT/US2019/042275 Preliminary Report on Patentability, dated Jan. 26, 2021, 9 pgs.
PCT/US2019/042275 International Search Report and Written Opinion mailed Nov. 6, 2019, 15 pgs.

* cited by examiner

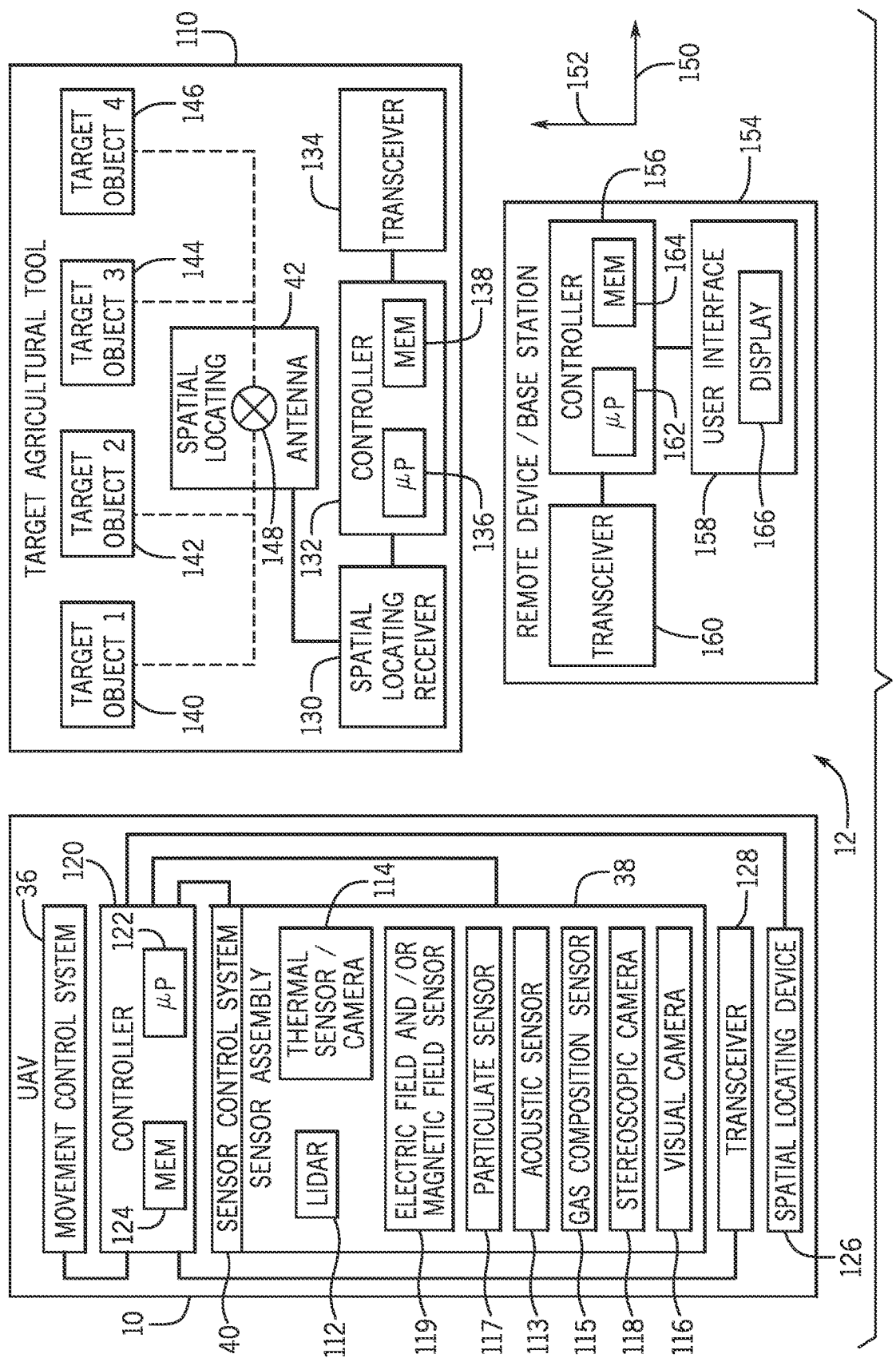

AERIAL MONITORING SYSTEM FOR AGRICULTURAL EQUIPMENT

CROSS-REFERENCE TO RELATED APPLICATIONS

This application is a national stage of PCT Application No. PCT/US2019/042275, entitled "Aerial Monitoring System for Agricultural Equipment", filed Jul. 17, 2019, which claims priority from and the benefit of U.S. Provisional Application No. 62/769,338, entitled "Aerial Monitoring System for Agricultural Equipment", filed Nov. 19, 2018, and U.S. Provisional Application No. 62/703,220, entitled "Aerial Monitoring System for Agricultural Equipment", filed Jul. 25, 2018. Each of the foregoing applications is hereby incorporated by reference in its entirety.

BACKGROUND

The present disclosure relates generally to an aerial monitoring system for agricultural equipment.

Certain agricultural implements include ground engaging tools configured to interact with the soil. For example, a tillage implement may include tillage points and/or disc blades configured to break up the soil for subsequent planting or seeding operations. In addition, a planting or seeding implement may include a blade (e.g., disc blade) configured to form a trench, furrow, or void within the soil to facilitate deposition of agricultural product (e.g., seed, fertilizer, etc.) beneath the soil surface. The planting or seeding implement may also include a closing disc and/or other suitable attachment(s), such as tine(s), reel(s), blade(s), or press wheel(s), configured to replace the soil within the trench, furrow, or void to promote seed germination, early plant vigor, and/or increased yield. Interaction between the ground engaging tools and the soil causes the tools to wear over time.

Operating an agricultural implement with worn tools may substantially reduce the effectiveness of the implement (e.g., during field operation due to worn discs, blades, tines, etc., and/or during road transport due to worn tires, etc.). For example, operating a tilling implement with worn tillage points and/or worn disc blades may substantially reduce the soil movement caused by the tillage tools engaging the soil, thereby reducing the effectiveness of tilling operations (e.g., in achieving a suitable seedbed and/or in reducing soil compaction within vehicle traffic patterns). In addition, operating a seeding or planting implement with worn blades may cause improperly shaped trenches to be formed, thereby causing seeds to be deposited at undesirable depths and/or establishing undesirable soil density surrounding or overlying the seeds. Accordingly, worn tools are typically replaced with new tools to maintain the agronomic effectiveness of the agricultural implement. In addition, elements that facilitate movement of the agricultural implement, such as bearings, tires, tracks, and spindles, during operation and transport of the agricultural implement may also wear over time. Unfortunately, the process of manually identifying worn tools and/or elements that facilitate implement movement is subjective and time-consuming, and the degree of wear (e.g., the degree of wear sufficient for the tool to be replaced) is difficult to determine (e.g., especially in-season when skilled technicians/operators are not readily available to perform such an inspection).

BRIEF DESCRIPTION

In certain embodiments, an aerial monitoring system for agricultural equipment includes a base station having a controller and a user interface. The controller includes a memory and a processor, and the controller is configured to receive a first signal from an unmanned aerial vehicle (UAV) indicative of a point cloud corresponding to a target object on a target agricultural tool. The controller is also configured to compare the point cloud to a model of the target object in a reference unworn state and to determine a state of wear of the target object based on the comparison. In addition, the controller is configured to determine an estimated cost to repair or replace the target object and/or a value of the target agricultural tool based on the state of wear of the target object. The controller is also configured to instruct the user interface to present the estimated cost to repair or replace the target object and/or the value of the target agricultural tool.

DRAWINGS

These and other features, aspects, and advantages of the present disclosure will become better understood when the following detailed description is read with reference to the accompanying drawings in which like characters represent like parts throughout the drawings, wherein:

FIG. 5 is a block diagram of an embodiment of an aerial monitoring system and a target agricultural tool.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
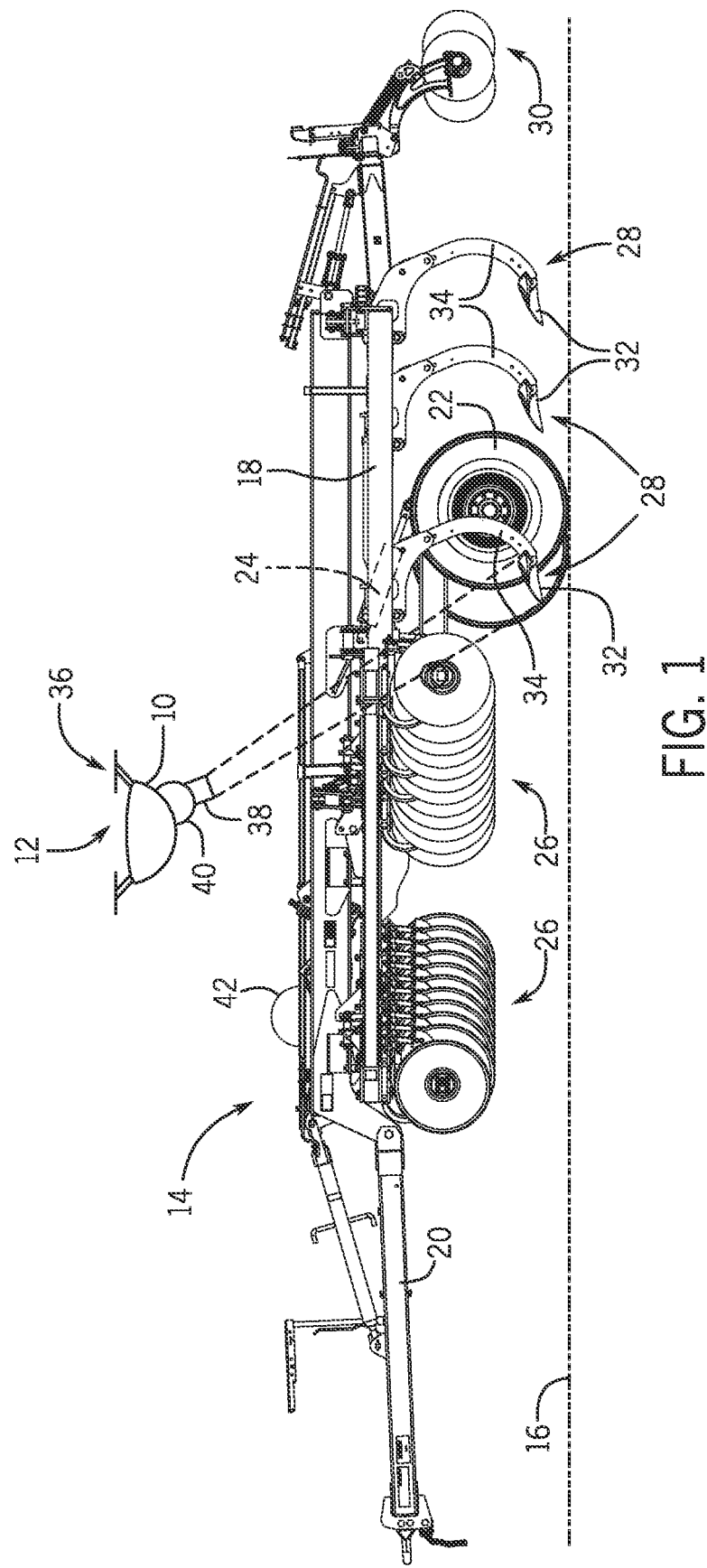
FIG. 1 is a side view of an embodiment of an unmanned aerial vehicle (UAV) of an aerial monitoring system and a target agricultural implement.

Turning to the drawings, FIG. 1 is a side view of an embodiment of an unmanned aerial vehicle (UAV) 10 of an aerial monitoring system 12 and a target agricultural implement 14. In the illustrated embodiment, the target agricultural implement 14 is a primary tillage implement having multiple ground engaging tools configured to till soil 16. As illustrated, the target agricultural implement 14 includes a frame 18 and a hitch assembly 20 coupled to the frame 18. The hitch assembly 20 is configured to couple to a work vehicle (e.g., tractor), and the work vehicle is configured to tow the target agricultural implement 14 through a field. In the illustrated embodiment, the target agricultural implement 14 includes wheels 22 configured to engage the surface of the soil 16 and to support at least a portion of the target agricultural implement 14. In addition, the target agricultural implement 14 includes an actuator 24 configured to move the wheels 22 from the illustrated lowered position to a raised position. While the wheels 22 are in the illustrated lowered position, the ground engaging tools of the target agricultural implement 14 are disengaged from the soil 16 (e.g., to facilitate transport and/or inspection of the target agricultural implement 14). The actuator 24 may lift the wheels 22 to the raised position, thereby causing the ground engaging tools to engage the soil 16. Once the ground engaging tools are engaged with the soil 16, the work vehicle may tow the target agricultural implement 14 throughout a field.

In the illustrated embodiment, the target agricultural implement 14 includes disc blades 26, tillage point assemblies 28, and finishing reels 30. The disc blades 26 are configured to engage a top layer of the soil. As the target agricultural implement 14 is towed through the field, the disc blades 26 are driven to rotate, thereby breaking up the top layer. In the illustrated embodiment, the disc blades 26 are arranged in two rows. However, in alternative embodiments, the disc blades may be arranged in more or fewer rows (e.g., 1, 2, 3, 4, 5, 6, or more). In addition, the angle of each row may be selected to control the interaction of the disc blades 26 with the top layer of soil. The tillage point assemblies 28 are configured to engage the soil at a greater depth, thereby breaking up a lower layer of the soil 16. In the illustrated embodiment, each tillage point assembly 28 includes a tillage point 32 and a shank 34. The shank 34 is configured to position the tillage point 32 at a target depth beneath the soil surface, and the tillage point 32 is configured to break up the soil 16. The shape of each tillage point, the arrangement of the tillage point assemblies, and the number of tillage point assemblies may be selected to control tillage within the field. Furthermore, as the target agricultural implement 14 is towed through the field, the finishing reels 30 are driven to rotate, thereby sizing soil clods, leveling the soil surface, smoothing the soil surface, and/or cutting residue on the soil surface.

The UAV 10 of the aerial monitoring system 12 is configured to monitor certain target objects of the target agricultural implement 14. For example, while the wheels 22 are in the illustrated lowered position, the disc blades 26, the tillage points 32, and the finishing reels 30 are disengaged from the soil 16. The UAV 10 is configured to monitor the ground engaging target objects, such as the disc blades 26, the tillage points 32, and the finishing reels 30, among other ground engaging target objects of the target agricultural implement 14. In certain embodiments, the UAV 10 is also configured to monitor non-ground engaging target objects, such as bearing(s), hub(s), spindle(s), and hinge(s), among other non-ground engaging target objects of the target agricultural implement 14. Monitoring target objects (e.g., ground engaging target objects and/or non-ground engaging target objects) facilitates determination of repair costs and/or the value the target agricultural implement.

In the illustrated embodiment, the UAV includes a movement control system 36, a sensor assembly 38, a sensor control system 40, and a controller. In certain embodiments, the controller is configured to receive a signal indicative of a position of a reference point on the target agricultural implement 14. In the illustrated embodiment, the target agricultural implement 14 includes a spatial locating antenna 42 configured to receive a spatial locating signal. For example, the spatial locating antenna may include a global positioning system (GPS) antenna configured to receive GPS signal from GPS satellites. The spatial locating antenna 42 may be communicatively coupled to a spatial locating device (e.g., GPS receiver) configured to determine the position, and in certain embodiments the velocity, of the target agricultural implement 14 (e.g., along the direction of travel). The reference point may correspond to location of the spatial locating antenna 42 on the target implement. Accordingly, the position of the reference point on the target agricultural tool may correspond to the position of the spatial locating antenna 42 relative to a global coordinate system. In certain embodiments, the target agricultural implement 14 includes a control system configured to output the position of the reference point directly to the UAV 10. However, in other embodiments, the control system of the target agricultural implement may output the position of the reference point to a base station/remote device, and the base station/remote device may relay the position of the reference point to the UAV 10. While the location of the reference point on the target agricultural implement corresponds to the location of the spatial locating antenna in the illustrated embodiment, in other embodiments, the location of the reference point may be offset (e.g., laterally and/or longitudinally offset) from the spatial locating antenna, such as at a lateral and/or longitudinal center of the target agricultural implement (e.g., relative to the direction of travel).

The controller of the UAV 10 is also configured to receive a position of a target object on the target agricultural implement 14 relative to the reference point. The target object may be selected from a list of candidate target objects. The candidate target objects include each disc blade 26, each tillage point 32, each finishing reel 30, each wheel 22, other object(s) on the target agricultural implement, or a combination thereof. In certain embodiments, the list of candidate target objects and/or the position of each target object relative to the reference point may be generated (e.g., by a control system of the remote device/base station) based on an image or rendering (e.g., from a model of the target agricultural implement). The list of target objects may be stored within the control system of the remote device/base station, a remote server/cloud, or a control system of the target agricultural implement, and the position of the each target object of the list of candidate target objects may be sequentially output to facilitate monitoring of each target object. Upon receiving the position of the reference point and the position of the target object relative to the reference point, the UAV controller determines a target point relative to the reference point that provides a line-of-sight to the target object. In certain embodiments, the target point is determined based on a model of the target agricultural implement. For example, determining a target point positioned directly above the reference point may not establish a line-of-sight to the target object due to an obstruction (e.g., structural member of the target agricultural implement) being positioned between the target point and the target object. Accordingly, the model of the target agricultural implement may be used to determine a target point of the UAV that establishes a line-of-sight between the sensor assembly and the target object e.g., by establishing a line-of-sight that does not intersect an obstruction on the agricultural implement).

Upon determining the target point, the UAV controller may output a signal to the movement control system 36 indicative of instructions to move the UAV 10 (e.g., the sensor assembly 38 of the UAV 10) to the target point. The movement control system 36 may include one or move propellers and/or ducted fans configured to lift the UAV 10 above the surface of the soil 16 and to control the direction of movement of the UAV 10. For example, the movement control system may be configured to tilt one or more of the propellers/ducted fans to control the direction of movement of the UAV (e.g., translation along a vertical axis, translation along a lateral axis, translation along a longitudinal axis, rotation about the vertical axis, rotation about the lateral axis, rotation about the longitudinal axis, etc.). Additionally and/or alternatively, the movement control system may be configured to control an output power of one or more of the propellers/ducted fans to control the direction of movement of the UAV (e.g., translation along a vertical axis, translation along a lateral axis, translation along a longitudinal axis, rotation about the vertical axis, rotation about the lateral axis, rotation about the longitudinal axis, etc.). Upon reaching the target point, the UAV controller may output a signal to the sensor control system 40 indicative of instructions to direct the sensor assembly 38 toward the target object. The sensor control system 40 may include one or more actuators (e.g., servo motors) configured to control a direction of the sensor assembly relative to a body of the UAV. In certain embodiments, the sensor assembly may be maintained in an initial orientation/direction (e.g., in embodiments in which the sensor assembly is directed toward the target object while in the initial orientation/direction, in embodiments in which the sensor assembly is fixed, etc.).

Once the sensor assembly 38 is directed toward the target object, the sensor assembly may monitor the target object and output a signal to the UAV controller indicative of a point cloud corresponding to the target object. For example, in certain embodiments, the sensor assembly 38 includes a LIDAR system configured to determine a point cloud corresponding to the target object and to output a signal to the UAV controller indicative of the point cloud. While the sensor assembly 38 includes a LIDAR system in the illustrated embodiment, in other embodiments, the sensor assembly may include any other suitable sensors, such as a visual spectrum camera, a thermal imaging or infrared (IR) camera/senor, an ultrasonic sensor, a capacitance sensor, an ultraviolet (UV) spectrum camera, a radio detection and ranging (RADAR) system, an acoustic sensor, a gas composition sensor, a particulate sensor, an electrical field sensor, a magnetic field sensor, other suitable sensor(s), or a combination thereof.

In certain embodiments, the controller of the UAV is configured to output a signal indicative of the point cloud of the target object to the control system of the remote device/base station. The control system of the remote device/base station is configured to receive the signal from the UAV indicative of the point cloud corresponding to the target object of the target agricultural tool. The remote device/base station control system is configured to compare the point cloud to a model of the target object in a reference unworn state. For example, the target object may be manufactural based on an engineering model (e.g., developed using engineering CAD software). The point cloud may be compared to the original engineering model of the part to determine wear. In certain embodiments, the state of wear of the target object (e.g., represented as a percentage) may be determined based on the comparison between the point cloud and the model of the target point.

Upon determining the state of wear of the target object (e.g., qualitative or quantitative state of wear), the remote device/base station control system may determine an estimated cost to repair or replace the target object based on the state of wear. Additionally or alternatively, the remote device/base station control system may determine a value of the target agricultural tool based on the state of wear. A user interface of the remote devise/base station may then present the estimated cost to repair or replace the target object and/or the value of the target agricultural implement to an operator. For example, the remote device/base station control system may determine whether to repair or replace the target object based on the state of wear. For example, if the state of wear is below a threshold, the control system may select a repair, and if the state of wear is above the threshold, the control system may select replacement. If a repair is selected, the control system may determine the repair cost based on the cost of replacement parts, the labor cost associated with installing the replacement parts (e.g., based on a labor rate and an estimated repair time), technician travel expenses, shipping cost(s), other factors that may affect the repair cost, or a combination thereof. For example, a lower state of wear may be less expensive to repair than a higher state of wear due utilization of fewer replacement parts and/or less labor associated with installation of the replacement parts. Furthermore, if replacement is selected, the control system may determine the replacement cost based on the cost of replacing the entire target object, the labor cost associated with installing the replacement target object (e.g., based on a labor rate and an estimated repair time), technician travel expenses, shipping cost(s), other factors that may affect the replacement cost, or a combination thereof. In certain embodiments, the control system may determine the value of the target agricultural implement based on the state of wear of the target object. For example, the value of the target object may be determined based on a price of a used target object having the determined state of wear (e.g., using a database of object values, an empirical formula, etc.). The value of the target object may then be added to the value of the remainder of the target agricultural implement (e.g., determined based at least in part on previous valuations of other target objects) to determine the value of the target agricultural implement.

Once repair/replacement cost and/or the value of the agricultural implement is determined and presented to the operator/owner/manager, the process described above may be repeated for another target object on the list of candidate target objects. Accordingly, in certain embodiments, the repair/replacement cost of each target object on the target agricultural implement may be determined. In addition, in certain embodiments, the value of each target object on the agricultural implement may be determined. These values may be added to one another to determine the total value of the target objects. The total value of the target objects may be added to the value of the remainder of the target agricultural implement to determine the total value of the agricultural implement. The control system may generate a report that details the value of each target object (e.g., based on a comparison to comparable objects) and the remainder of the target agricultural implement to provide a buyer with a detailed explanation of the pricing information. Additionally or alternatively, the control system may generate a report that indicates a qualitative state of wear (e.g., excellent, good, fair, poor, etc.) and/or a quantitative state of wear (e.g., percentage of useful life remaining, acres remaining, time remaining, etc.) of each target object. The value report and/or the state of wear report may include an image of each target object (e.g., overlaid with an image or illustration of an unworn object) to facilitate visual identification of the wear area(s). Furthermore, a potential buyer may inspect an agricultural implement with the aerial monitoring system to determine an estimated value (e.g., for comparison to the asking price of the agricultural implement.

In certain embodiments, the total repair/replacement cost may be compared to the total value of the target agricultural implement to facilitate determination of whether to repair/replace target objects, to sell the agricultural implement, or a combination thereof. For example, the control system may determine that repairing/replacing a portion of the target objects may provide an increase in value of the target agricultural implement greater than the repair/replacement costs of the portion of the target objects. Accordingly, the control system may recommend repairing/replacing the portion of the target objects to increase the total return the owner of the target agricultural implement will receive upon selling the target agricultural implement.

The control system may also consider the total cost of ownership in determining whether to repair/replace the target objects or sell the agricultural implement. For example, the total cost of ownership may increase over time as parts being to wear. Accordingly, if the total cost of ownership, including repairing/replacing the target objects, and any financing payments is greater than the cost of ownership and financing payments on a new agricultural implement (e.g., the financing payments may be reduced by the estimated valuation of the current agricultural implement), the control system may recommend selling the current agricultural implement and buying a new agricultural implement. The control system may also compare the cost of maintaining the current agricultural implement to the cost of leasing a replacement implement, renting a replacement implement, or otherwise acquiring the use of a replacement implement.

In addition, in certain embodiments, the remote device/base station control system may determine a recommended operating speed based on the state of wear of the target object, the usage (e.g., measured in time, measured in distance, etc.) of the target object, and a machine setting (e.g., soil penetration depth, downforce, etc.). For example, if the state of wear is less than an average state of wear for objects that experienced similar usage, the control system may determine that a higher operating speed is recommended. In addition, if the state of wear is greater than the average state of wear for objects that experienced similar usage, the control system may determine that a lower speed is recommended. The control system may instruct the user interface to present the recommended speed to an operator, manager, and/or owner of the implement.

By way of example, in the illustrated embodiment, the target object is one of the tillage points 32. Accordingly, the UAV controller may receive a signal indicative of the position of the reference point on the target agricultural implement 14 (e.g., the position of the spatial locating antenna 42). The UAV controller may then receive a signal indicative of a position of the target tillage point 32 on the target agricultural implement 14 relative to the reference point. Next, the UAV controller may determine a target point relative to the reference point that provides a line-of-sight to the target tillage point 32. The UAV controller may then output a signal to the movement control system 36 indicative of instructions to move to the target point. In addition, the UAV controller may output a signal to the sensor control system 40 indicative of instructions to direct the sensor assembly 38 toward the target tillage point 32, as illustrated. The sensor assembly 38 may output a signal to the UAV controller indicative of a point cloud corresponding to the target tillage point 32.

In certain embodiments, the UAV controller may instruct the movement control system to position the UAV at one or more subsequent target points. In such embodiments, the UAV controller may instruct the sensor control system to direct the sensor assembly toward the target object at each of the subsequent target points. Accordingly, a more complete point cloud may be established, as compared to a point cloud established by monitoring the target tillage point from a single target point. In certain embodiments, the subsequent target point(s) may correspond to the target point associated with monitoring another target object. For example, upon reaching a target point for another target object, the UAV controller may monitor the other target object and the target tillage point (e.g., by instructing the sensor control system to direct the sensor assembly to the other target object and to the target tillage point, and in certain embodiments to further target objects).

Once the point cloud corresponding to the target tillage point 32 is established, the point cloud is compared to a model (e.g., geometric model) of the target tillage point in a reference unworn state. The state of wear of the target tillage point 32 is then determined based on the comparison. Next, an estimated cost to replace or replace the target tillage poin 32 and/or the value of the target agricultural implement 14 is determined based on the state of wear of the target tillage point 32. The estimated cost to repair or replace the target tillage point 32 and/or the value of the target agricultural implement is then presented on the user interface of the remote device/base station. The process described above may be repeated for all tillage points on the target agricultural implement. In addition, the process may be repeated for one or more disc blade (e.g., identifying bent and/or dull blades), one or more finishing reels, one or more tires of the wheels (e.g., monitoring the tread or the tire), or a combination thereof. Furthermore, in certain embodiments, the aerial monitoring system may monitor other and/or additional target objects on the target agricultural implement (e.g., coulter(s), knife blades, etc.). In addition, while monitoring target objects of a tillage tool is described above, in other embodiments, the aerial monitoring system may monitor one or more target objects on a harvester header, a seeder, a planter, a sprayer, a baler, or any other suitable type of agricultural tool.

Figure 2:
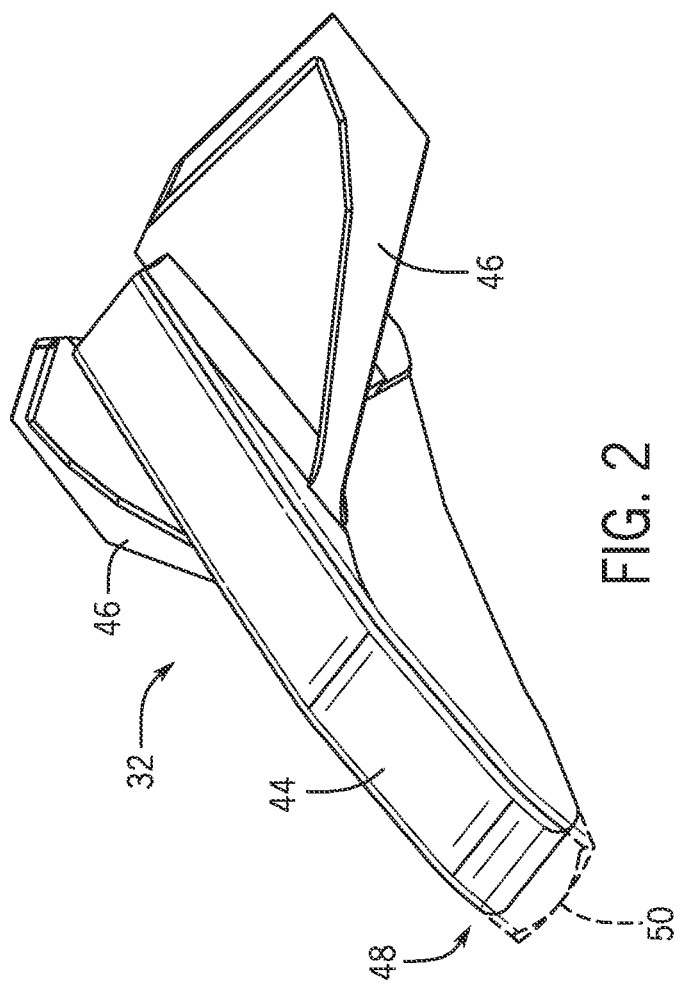
FIG. 2 is a perspective view of an embodiment of a tillage point that may be employed within the target agricultural implement of FIG. 1.

FIG. 2 is a perspective view of an embodiment of a tillage point 32 that may be employed within the target agricultural implement of FIG. 1. In the illustrate embodiment, the tillage point 32 has a body 44, wings 46, and a tip 48. However, in other embodiments, the tillage point may have any another suitable shape, and/or the tillage point may include other and/or additional features configured to engage and break up the soil. In the illustrated embodiment, the tip 48 of the tillage point 32 is worn relative to the unworn tillage point 50 represented by dashed lines. As previously discussed, a point cloud corresponding to the tillage point 32 (e.g., in the worn state) is compared to a model of the tillage point in the reference unworn state (e.g., as represented by the unworn tillage point in dashed lines). A state of wear of the tillage point is determined based on the comparison (e.g., percentage of wear, in which 0 percent corresponds to the unworn tillage point, and 100 percent corresponds to a completely worn tillage point). Next, the estimated cost to repair or replace the tillage point is determined, and/or a value to the target agricultural implement is determined based on the state of wear of the tillage point. The user interface then presents the estimated repair/replacement cost and/or the value of the target agricultural implement.

In certain embodiments, the user interface may also present a visual representation of the state of wear (e.g., a graph showing the state of wear, an overlay of the model on the point cloud, etc.) and/or a numerical representation of the state of wear (e.g., the percent of wear). The user interface may also present a rendered image of the tillage point based on the point cloud. For example, the remote device/base station controller may establish a 3D rendered image based on the point cloud and instruct a display of the user interface to present the 3D rendered image. Furthermore, in certain embodiments, the user interface may present a visual spectrum image, a stereoscopic image, a thermal (e.g., IR) image, an electrostatic image, or another suitable type of image of the tillage point based on data acquired by the sensor assembly.

Figure 3:
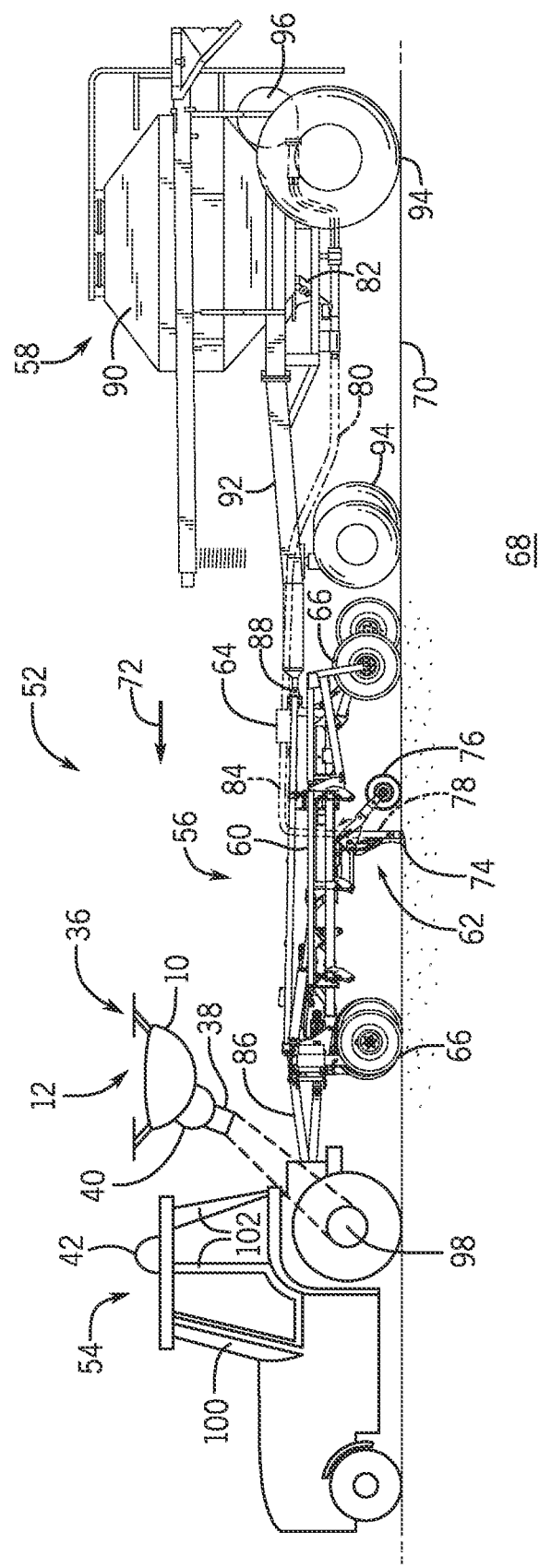
FIG. 3 is a side view of an embodiment of a UAV of an aerial monitoring system and a target agricultural work system.

FIG. 3 is a side view of an embodiment of a UAV 10 of an aerial monitoring system 12 and a target agricultural system 52. In the illustrated embodiment, the target agricultural system 52 includes a work vehicle 54, an agricultural implement 56, and an air cart 58. As depicted, the agricultural implement 56 includes a tool frame 60 coupled to a row unit 62 (e.g., ground engaging opener assembly), a header 64, and wheel assemblies 66. The agricultural implement 56 is towed by the work vehicle 54 (e.g., a tractor) to deposit rows of agricultural product within soil 68. The wheel assemblies 66 contact a surface 70 of the soil 68 to enable the agricultural implement 56 to be towed by the work vehicle 54 along a direction of travel 72. As the agricultural implement 56 is towed along the direction of travel 72, a row of agricultural product may be deposited into the soil 68 by each row unit 62 (e.g., ground engaging opener assembly). Although only one row unit 62 is shown, the agricultural implement 56 may include multiple row units organized in one or more rows across the agricultural implement 56. In some embodiments, the agricultural implement may include one or more rows of 12, 14, 16, 18, 20, or more row units, which may each deposit a respective row of agricultural product into the soil.

To facilitate depositing the agricultural product into the soil 68, each row unit 62 (e.g., ground engaging opener assembly) includes an opener 74, a press wheel 76, and a product tube 78. While the opener 74 engages the soil 68, the opener 74 exerts a force onto the soil that excavates a trench into the soil as the row unit 62 travels through the field along the direction of travel 72. The agricultural product is deposited into the excavated trench via the product tube 78. Then, the press wheel 76 packs soil onto the deposited agricultural product. In certain embodiments, the press wheel of at least one row unit may be omitted. For example, at least one press wheel may be mounted to the frame of the agricultural implement behind the at least one row unit. In certain embodiments, the row unit may also include a residue manager, a closing assembly, another suitable ground engaging tool, or a combination thereof. Furthermore, while the illustrated row unit includes a ground engaging opener assembly, in alternative embodiments at least one row unit on the agricultural implement may include an applicator assembly configured to deposit agricultural product onto the surface of the field, or any other suitable type of material deposition assembly.

The header 64 is configured to provide the agricultural product to the row units 62. In some embodiments, the header 64 may pneumatically distribute the agricultural product from a primary line to secondary lines. For example, a primary line 80 may direct agricultural product from the air cart 58 (e.g., a metering system 82 of the air cart 58) to the header 64. Additionally, the header 64 may distribute the agricultural product to the row units 62 via respective secondary lines 84. In certain embodiments, multiple primary lines may direct agricultural product to multiple headers. Moreover, multiple secondary lines may extend from each header to respective row units. Furthermore, in certain embodiments, at least one secondary line may extend to a secondary header, and multiple tertiary lines may extend from the secondary header to respective row units.

In the illustrated embodiment, the air cart 58 is towed behind the agricultural implement 56. For example, the agricultural implement 56 may be coupled to the work vehicle 54 by a first hitch assembly 86, and the air cart 58 may be coupled to the agricultural implement 56 by a second hitch assembly 88. However, in other embodiments, the agricultural implement may be towed behind the air cart. In further embodiments, the implement and the air cart may be part of a single unit that is towed behind the work vehicle or may be elements of a self-propelled vehicle.

The air cart 58 may centrally store agricultural product and distribute the agricultural product to the header 64. In the illustrated embodiment, the air cart 58 includes a storage tank 90, a frame 92, wheels 94, and an air source 96. As illustrated, the towing hitch 88 is coupled between the tool frame 60 and to the air cart frame 92, which enables the air cart 58 to be towed with the agricultural implement 56. Additionally, the storage tank 90 is configured to centrally store the agricultural product. In some embodiments, the storage tank 90 may include multiple compartments for storing different types of agricultural product. For example, a first compartment may store seeds while a second compartment may store a dry fertilizer. In such configurations, the air cart 58 may deliver both seeds and fertilizer to the implement 56 via separate distribution systems, or as a mixture through a single distribution system.

From the storage tank 90, the agricultural product may be fed into the metering system 82, which meters the agricultural product into an airflow provided by the air source 96. The airflow fluidizes the agricultural product for distribution to the header 64 via the primary line 80. As depicted, the metering system 82 is mounted to the bottom of the storage tank 90. To facilitate distributing the agricultural product, the airflow output by the air source 96 may be guided though the metering system 82 via a plenum. In some embodiments, the air source 96 may be one or more pumps and/or blowers powered by electric or hydraulic motor(s), for example.

In certain embodiments (e.g., embodiments in which the air cart is towed behind the agricultural implement or embodiments in which the air cart is towed in front of the agricultural implement), the air source and/or the plenum may be mounted to a rear portion of the air cart (e.g., relative to a direction of travel). In other embodiments (e.g., embodiments in which the air cart is towed in front of the implement or embodiments in which the air cart is towed behind the implement), the air source and/or the plenum may be mounted to a front portion of the air cart (e.g., relative to the direction of travel). Furthermore, in embodiments in which the air cart includes multiple distribution systems, multiple air sources and/or plenums may be utilized. For example, if the air cart includes two separate distribution systems for separately distributing seeds and fertilizer to the row units, the air cart may include two air sources and two plenums (e.g., one air source and one plenum for each distribution system). In embodiments in which the air cart includes a single distribution system (e.g., in which one or more products are metered from one or more metering systems into pneumatic lines), a single air source and/or a single plenum may be utilized. In certain embodiments, multiple air sources and/or multiple plenums may provide an air flow to multiple groups of lines (e.g., one group of lines coupled to each plenum). In such embodiments, corresponding lines from each group may merge in the metering system, thereby establishing a combined flow to the implement.

In the illustrated embodiment, the aerial monitoring system 12 includes the UAV 10 configured to monitor various objects within the target agricultural system 52. As previously discussed, the UAV 10 includes a movement control system 36, a sensor assembly 28, a sensor control system 40, and a controller. The controller is communicatively coupled to the movement control system, the sensor assembly, and the sensor control system. In the illustrated embodiment, the UAV is configured to monitor one more target objects within the target agricultural system 52 while the agricultural system 52 is moving in the direction of travel 72, thereby monitoring the target object(s) while in operation (e.g., as compared to monitoring object(s) on a stationary agricultural tool). However, in other embodiments, the UAV may monitor the target object(s) while the target agricultural system is stopped (e.g., during a pause in agricultural operations).

In the illustrated embodiment, the controller of the UAV 10 is configured to receive a signal indicative of a position and a velocity of a reference point on a target agricultural tool of the target agricultural system 52. The target agricultural tool may be the work vehicle 54, the agricultural implement 56, the air cart 58, or another suitable agricultural tool. Furthermore, the reference point may correspond to the location of a spatial locating antenna on the target agricultural tool. Accordingly, the position of the reference point on the target agricultural tool may correspond to the position of the spatial locating antenna relative to a global coordinate system. In addition, the velocity of the reference point may correspond to the velocity of the spatial locating antenna relative to the global coordinate system. In the illustrated embodiment, the spatial locating antenna 42 is positioned on the work vehicle 54. Accordingly, if the work vehicle is the target agricultural tool, the position/velocity of the reference point may correspond to the position/velocity of the spatial locating antenna 42 on the work vehicle 54. However, in other embodiments, the location of the reference point may be offset (e.g., laterally and/or longitudinally offset) from the spatial locating antenna. For example, if the agricultural implement is the target agricultural tool, the location of the reference point may be offset from the spatial locating antenna on the work vehicle to a lateral and/or longitudinal center of the agricultural implement. In addition, if the air cart is the target agricultural tool, the location of the reference point may be offset from the spatial locating antenna on the work vehicle to a lateral and/or longitudinal center of the air cart. Furthermore, the location of the reference point may be otherwise offset from the location of the spatial locating antenna.

In addition to receiving the position and velocity of the reference point, the UAV controller may also receive a signal indicative of a position of a target object on the target agricultural tool relative to the reference point. The UAV controller may then determine a target point relative to the reference point that provides a line-of-sight to the target object. In certain embodiments, the target point is determined based on a model of the target agricultural implement. For example, determining a target point positioned directly above the reference point may not establish a line-of-sight to the target object due to an obstruction (e.g., structural member of the target agricultural implement) being positioned between the target point and the target object. Accordingly, the model of the target agricultural implement may be used to determine a target point of the UAV that establishes a line-of-sight between the sensor assembly and the target object (e.g., by establishing a line-of-sight that does not intersect an obstruction on the agricultural implement).

Upon determining the target point, the UAV controller may output a signal to the movement control system 36 of the UAV 10 indicative of instructions to move to the target point and to maintain the velocity of the reference point on the target agricultural tool in response to reaching the target point. As previously discussed, the movement control system 36 may include one or move propellers and/or ducted fans configured to lift the UAV 10 above the surface of the soil 70 and to control the direction of movement of the UAV 10. For example, the movement control system may be configured to tilt one or more of the propellers/ducted fans to control the direction of movement of the UAV. Additionally and/or alternatively, the movement control system may be configured to control an output power of one or more of the propellers/ducted fans to control the direction of movement of the UAV. Upon reaching the target point and maintaining the velocity of the reference point, the UAV controller may output a signal to the sensor control system 40 indicative of instructions to direct the sensor assembly 38 toward the target object. As previously discussed, the sensor control system 40 may include one or more servo motors configured to control a direction of the sensor assembly relative to a body of the UAV.

Once the sensor assembly 38 is directed toward the target object, the sensor assembly may monitor the target object and output a signal to the UAV controller indicative of data acquired by the sensor assembly 38 (e.g., thermal sensor data, visual image data, point cloud data, etc.). For example, in certain embodiments, the sensor assembly 38 includes a thermal (e.g., IR) sensor or camera configured to output a signal indicative of thermal (e.g., IR) emissions from the target object. While the sensor assembly 38 includes a thermal sensor/camera in the illustrated embodiment, in other embodiments, the sensor assembly may include any other suitable sensors, such as a visual spectrum camera, a LIDAR system, an ultrasonic sensor, a capacitance sensor, an ultraviolet (UV) spectrum camera, a radio detection and ranging (RADAR) system, an acoustic sensor, a gas composition sensor, a particulate sensor, an electrical field sensor, a magnetic field sensor, other suitable sensor(s), or a combination thereof.

The UAV controller is configured to receive the signal from the thermal (e.g., IR) sensor/camera and to output a corresponding signal indicative of the thermal (e.g., IR) emissions data to a remote device/base station via a transceiver. A controller of the remote device/base station may receive the signal via a corresponding transceiver and determine a temperature profile and/or thermal image of the target object based on the signal. For example, the remote device/base station controller may determine a maximum temperature of the target object, an average temperature of the target object, a temperature of certain portion(s) of the target object, or a combination thereof. In certain embodiments, the controller of the remote device/base station may compare the temperature (e.g., average temperature, maximum temperature, etc.) of the target object to a threshold reference temperature. The remote device/base station controller may then instruct a user interface of the remote device/base station to present a notification in response to determining that the temperature is above the threshold reference temperature. Furthermore, in certain embodiments, the controller of the remote device is configured to instruct the user interface (e.g., a display of the user interface) to present an image of the target object based on the data (e.g., thermal/IR emissions) data received by the sensor assembly. The image may enable an operator to identify portions of the target object having a higher temperature than desired and/or portions of the target object having a lower temperature than desired, thereby facilitating evaluation of machine settings (e.g., soil penetration depth, downforce, ground speed, etc.). Furthermore, in certain embodiments, the remote device/base station controller may analyze the image and provide a recommendation for adjusting one or more machine settings (e.g., soil penetration depth, downforce, ground speed, etc.).

In certain embodiments, the controller of the remote device/base station is configured to determine an estimated cost associated with repairing or replacing the target object in response to determining that the temperature of the target object is above the threshold reference temperature. In addition, the controller of the remote device/base station is configured to instruct the user interface to present the estimated cost. If the maximum temperature and/or the average temperature of the target object is above the threshold reference temperature, the target object may not be working efficiently. For example, if the average temperature of a bearing is greater than the threshold reference temperature associated with the bearing, the bearing may not be functioning effectively. Accordingly, the remote device/base station controller may automatically determine the cost of repairing or replacing the bearing to enable an operator, owner, or technician to determine whether the cost of replacing the target object is justified for the state of wear of the target object.

Because the UAV is configured to match the velocity of the target agricultural tool during operation of the target agricultural tool, the sensor assembly may monitor the target object during operation. As a result, an operational temperature of the target object may be determined, thereby providing information regarding the state (e.g., state of wear, operational state, etc.) of the target object during operation. For example, to determine the state of the target object while the target agricultural tool is stationary, a technician may disassemble a portion of the target agricultural tool to access the target object, remove the target object from the target agricultural tool, and inspect the target object. Accordingly, the inspection process may be time-consuming and expensive. However, by monitoring the temperature of the target object during operation of the target agricultural tool, the state of the target object may be determined more readily (e.g., without disassembly of the target agricultural tool, without removal of the target object, etc.), thereby significantly reducing the duration associated with determining the state of the target object.

In the illustrated embodiment, the sensor assembly 38 is directed toward a wheel bearing 98 of the work vehicle 54. Accordingly, to determine a state of the wheel bearing 98, the controller of the UAV 10 may receive a signal indicative of a position and a velocity of a reference point on the work vehicle 54 (e.g., target agricultural tool). For example, the location of the reference point may correspond to the location of the spatial locating antenna 42 on the work vehicle 54. Accordingly, the position and the velocity of the reference point corresponds to the position and the velocity of the spatial locating antenna 42. Next, the controller of the UAV 10 may receive a signal indicate of a portion of the wheel bearing 98 (e.g., target object) relative to the reference point. The UAV controller may then determine a target point relative to the reference point that provides a line-of-sight to the wheel bearing 98 (e.g., based on a model to the work vehicle 54). Upon determining the target point, the UAV controller may output a signal to the movement control system 36 indicative of instructions to move to the target point and to maintain the velocity of the reference point in response to reaching the target point. The UAV controller may then output a signal to the sensor control system 40 indicative of instructions to direct the sensor assembly 38 toward the wheel bearing 98, and the UAV controller may receive a signal from the sensor assembly 38 indicative of data acquired by the sensor assembly 38.

The UAV controller may output a signal indicative of the sensor data to a controller of a remote device/base station (e.g., via respective transceivers). In certain embodiments, the remote device/base station controller may determine a quantitative temperature (e.g., temperature measured in degrees) and/or a qualitative temperature (e.g., cold, within an acceptable range, hot, etc.) of the wheel bearing 98 based on the sensor data. For example, the remote device/base station controller may determine the average temperature of the wheel bearing 98, the maximum temperature of the wheel bearing 98, the temperature of a selected portion of the wheel bearing 98 (e.g., the raceway(s), the rolling element(s), etc.), another temperature associated with the wheel bearing, or a combination thereof. The remote device/base station controller may then compare the temperature of the wheel bearing 98 to a threshold reference temperature, and instruct a user interface to present a notification in response to determining that the temperature is above the threshold reference temperature. In addition, the remote device/base station controller may determine an estimated performance of the wheel bearing 98, an estimated remaining useful life of the wheel bearing 98 (e.g., measured in time or distance), a state of wear of the wheel bearing 98, or a combination thereof, based on the temperature and/or the temperature profile of the wheel bearing 98. The remote device/base station controller may then instruct the user interface to present an indication (e.g., visual indication) of the estimated performance of the wheel bearing 98, the estimated remaining useful life of the wheel bearing 98, the state of wear of the wheel bearing 98, or a combination thereof. The operator of the target agricultural system 52 and/or a technician may determine whether to repair/replace the wheel bearing 98 based on the notification, the estimated performance, the estimated remaining useful life, the state of wear, or a combination thereof. Furthermore, in certain embodiments, the controller of the remote device/base station is configured to determine an estimated cost associated with repairing or replacing the wheel bearing 98 in response to determining that the temperature of the wheel bearing is above the threshold reference temperature. In addition, the controller of the remote device/base station is configured to instruct the user interface to present the estimated cost.

While a wheel bearing is described above, the aerial monitoring system 12 may be utilized to monitor other bearings and/or other rotating components within the target agricultural system. For example, the aerial monitoring system 12 may monitor the bearing of each wheel assembly 66 of the agricultural implement 56, the bearing of the press wheel 76 of each row unit 62, the bearing of each wheel 94 of the air cart 58, one or more bearings within the metering system 82, one or more bearings within the air source 96, other bearing and/or rotating components within the agricultural system 52 (e.g., chaff spreaders, conditioning reels, flail assemblies, etc.), or a combination thereof. Furthermore, the aerial monitoring system 12 may determine a state of wear of ground engaging tools, such that the opener 74 and the press wheel 76. For example, the remote device/base station controller may determine a temperature profile of the opener 74 (e.g., while the opener is engaging the soil) based on the sensor data. The remote device/base station controller may then compare the temperature profile of the opener 74 to a reference temperature profile associated with operating an unworn opener. In addition, the remote device/base station controller may instruct the user interface to present a notification in response to determining that the temperature profile of the opener 74 differs from the reference temperature profile by more than a threshold amount.

Furthermore, the remote device/base station controller may determine an estimated performance of the opener 74, an estimated remaining useful life of the opener 74 (e.g., measured in time or distance), a state of wear of the opener 74, or a combination thereof, based on the temperature profile of the opener 74. The remote device/base station controller may also identify cracks, chips, bends, other anomalies, or a combination thereof, based on the temperature profile of the opener 74 (e.g., which may be verified by a point cloud inspection/model comparison, as described above with reference to FIG. 1). The remote device/base station controller may then instruct the user interface to present an indication (e.g., visual indication) of the estimated performance of the opener 74, the estimated remaining useful life of the opener 74, the state of wear of the opener 74, identified anomalies within the opener 74, or a combination thereof. The operator of the target agricultural system 52 and/or the technician may determine whether to repair/replace the opener 74 based on the notification, the estimated performance, the estimated remaining useful life, the state of wear, the identified anomalies, or a combination thereof. Furthermore, in certain embodiments, the controller of the remote device/base station is configured to determine an estimated cost associated with repairing or replacing the opener 74 in response to determining that the temperature profile of the opener 74 differs from the reference temperature profile by more than a threshold amount (e.g., a crack may cause a localized temperature difference that establishes a temperature profile different from the reference temperature profile by more than a threshold amount). In addition, the controller of the remote device/base station is configured to instruct the user interface to present the estimated cost. While monitoring the opener 74 is described above, the aerial monitoring system may be configured to monitor (e.g., determine the state of wear, determine the performance, determine the remaining useful life, identify anomalies, etc.) other ground engaging tools, such as wheels, disc blades, coulters, tines, and reels, tillage points, among others.

In certain embodiments, the aerial monitoring system 12 may also monitor air leakage from a cab 100 of the work vehicle 54. For example, the target object may be one or more seals 102 configured to block air flow from and into the cab 100. The controller of the UAV 10 may receive a signal indicative of the position and the velocity of the reference point on the work vehicle 54, and receive a signal indicative of the position of the one or more seals 102 relative to the reference point. The UAV controller may then determine a target point relative to the reference point that provides a line-of-sight to the one or more seals 102. Upon determining the target point, the UAV controller may output a signal to the movement control system indicative of instructions to move to the target point and to maintain the velocity of the reference point in response reaching the target point. The UAV controller may then output a signal indicative of instructions to direct the sensor assembly toward the target object and receive a signal from the sensor assembly indicative of data acquired by the sensor assembly.

As previously discussed, the data acquired by the sensor assembly may include thermal (e.g., IR) emissions data. Accordingly, the controller of the remote device/base station may determine a temperate profile of the air proximate to the one or more seals 102. In certain embodiments, remote device/base station controller is configured to determine whether the one or more seals are leaking based on the temperature profile. For example, if a significant portion of the air proximate to the one or more seals 102 (e.g., greater than a threshold portion of the air proximate to the one or more seals 102) has a temperature different than the ambient temperature (e.g., the difference between the temperature of the air proximate to the one or more seals 102 and the ambient temperature is greater than a threshold reference temperature), the remote device/base station controller may identify leaking seal(s). In certain embodiments, the controller of the remote device/base station is configured to determine an estimated cost associated with repairing or replacing the one or more seals 102 in response to identifying a leak. In addition, the controller of the remote device/base station is configured to instruct the user interface to present the estimated cost, thereby enabling the operator/owner/technician to determine whether the cost of repairing or replacing the one or more seals is justified based on the expected economic losses associated with the leakage (e.g., economic losses associated with heating or cooling losses, such as operating an air conditioner at a higher capacity, etc.). Furthermore, in certain embodiments, the remote device/base station controller may estimate the economic losses associated with the leaking seal(s) and instruct the user interface to present the estimated economic losses to the operator/owner/technician. The remote device/base station controller may also determine an amount of leakage based on the temperature profile and determine whether field debris (e.g., dust, etc.) may enter the cab based on the amount of leakage. If the remote device/base station controller determines that field debris may enter the cab, the remote device/base station controller may instruct the user interface to present a notification to the operator/owner/technician. In addition, the remote device/base station controller may provide a recommendation (e.g., via the user interface) regarding repairing or replacing the seal(s) based on the amount of leakage and/or an economic analysis of the repair/replacement cost and the estimated economic losses.

Because the UAV is configured to match the velocity of the work vehicle during operation of the work vehicle, seal leakage may be monitored during operation of the agricultural system. Accordingly, the seal leaking monitoring may be performed without stopping the agricultural system, thereby increasing the operational time of the agricultural system. While monitoring rotating components and seals is described above, the aerial monitoring system may also be utilized to monitor other components within the agricultural system that emit heat, such as electric motors, hydraulic motors, heat exchangers, hoses, lines, valve bodies, translating components (e.g., cutter bars, etc.), among others. For example, the operator/technician may be notified if a temperature of a motor is greater than a threshold reference temperature, thereby enabling the operator/technician to take corrective action (e.g., reduce load on the motor, repair the motor, replace the motor, etc.). In addition, the operator/technician may be notified if a temperature of belt/belt guide is greater than a threshold reference temperature, thereby enabling the operator/technician to adjust the belt/belt guide to establish proper alignment (e.g., thereby reducing premature belt wear). Furthermore, the operator/technician may be notified if a temperature of electrical wiring is greater than a threshold reference temperature and/or if a temperature profile of the electrical wiring differs from a reference temperature profile by more than a threshold amount (e.g., indicating a voltage drop, a magnet field anomaly, etc.), thereby enabling the operator/technician to inspect and/or replace the wiring.

The aerial monitoring system may also be utilized to detect an anhydrous ammonia leak from a fertilizer applicator during operation of the fertilizer applicator. The temperature of leaking anhydrous ammonia may be lower that the ambient temperature due to the expansion of the anhydrous ammonia as it enters the atmosphere. Accordingly, the operator/technician may be notified of the leaking anhydrous ammonia if a temperature of the proximate to an anhydrous ammonia conduit is lower than ambient temperature, thereby enabling the operator/technician to repair or replace the anhydrous ammonia conduit. In addition, the operator/technician may be notified if a temperature of harvested agricultural product is greater than a threshold reference temperature. For example, if the temperature of harvested hay or forage exceeds a threshold reference temperature, the quality of the harvested product may be reduced. Accordingly, aerial monitoring system may inform an operator/technician if the harvested product temperature exceeds a threshold reference temperature, thereby enabling the operator/technician to take corrective action (e.g., redistribute the harvested product within the storage compartment, remove the harvested product from the storage compartment, etc.). Furthermore, the aerial monitoring system may be used to determine the performance of a fan (e.g., cooling fan, etc.). For example, the temperature of air exiting the fan may be different (e.g., cooler) than the surrounding ambient air. Accordingly, the qualitative or quantitative performance of the fan may be determined by monitoring the air proximate to the fan exit. The operator/technician may be informed if the qualitative or quantitative performance of the fan is below a threshold performance.

In certain embodiments, the sensor assembly of the UAV includes an acoustic sensor, such as one or more microphones. The acoustic sensor may receive audio signals (e.g., sound waves) from various components of the target agricultural system, such as the engine of the work vehicle, the transmission of the work vehicle, a power takeoff (PTO) shaft of the work vehicle, a fan of the work vehicle, a suspension (e.g., cab suspension) of the work vehicle, the undercarriage of the work vehicle, the air source of the air cart, or the metering system of the air cart, among other components of the target agricultural system. The UAV controller, in turn, may output a signal indicative of the acoustic sensor data to the controller of the remote device/base station (e.g., via respective transceivers). The remote device/base station controller may compare the audio signals emitted by the acoustically monitored component (e.g., target object) to baseline/nominal audio signals for the acoustically monitored component. The remote device/base station controller may also compare the audio signals emitted by the acoustically monitored component to audio signals associated with various fault conditions of the acoustically monitored component (e.g., engine misfire, improper transmission shifting, unbalanced PTO shaft, unbalanced fan, etc.). In addition, the remote device/base station controller may determine an estimated performance of the acoustically monitored component, an estimated remaining useful life of the acoustically monitored component (e.g., measured in time or distance), a state of wear of the acoustically monitored component, or a combination thereof, based on the audio signal comparison(s). The remote device/base station controller may then instruct the user interface to present an indication (e.g., visual indication) of the estimated performance of the acoustically monitored component, the estimated remaining useful life of the acoustically monitored component, the state of wear of the acoustically monitored component, or a combination thereof. The operator of the target agricultural system and/or a technician may determine whether to repair/replace the acoustically monitored component based on the indication, the estimated performance, the estimated remaining useful life, the state of wear, or a combination thereof. Furthermore, in certain embodiments, the controller of the remote device/base station is configured to determine an estimated cost associated with repairing or replacing the acoustically monitored component (e.g., if repair or replacement is desired). In addition, the controller of the remote device/base station is configured to instruct the user interface to present the estimated cost. Due to the non-directional nature of sound waves, the acoustically monitored component may be different than the target object described above. That is, the sensor assembly may not be directed toward the acoustically monitored component while the acoustic sensor is receiving audio signals from the acoustically monitored component.

In certain embodiments, the sensor assembly of the UAV includes a gas composition sensor, such as an oxides of nitrogen (NOx) sensor, a carbon monoxide (CO) sensor, or an anhydrous ammonia sensor, among other suitable gas composition sensors. The gas composition sensor may receive gas emitted from various components of the target agricultural system, such as the exhaust system of the work vehicle, or an anhydrous ammonia tank and/or anhydrous ammonia lines of a fertilizer applicator, among other components of the target agricultural system. The UAV controller, in turn, may output a signal indicative of the gas composition sensor data to the controller of the remote device/base station (e.g., via respective transceivers). The remote device/base station controller may compare the concentration of each detected gas constituent to a threshold reference concentration for the gas constituent(s) (e.g., based on the separation distance between the gas emitter and the gas composition sensor), and instruct a user interface to present a notification in response to determining that the concentration of at least one gas constituent is above the respective threshold reference concentration. While the gas composition sensor is monitoring the exhaust gas from the exhaust system of the work vehicle, the remote device/base station controller may determine an estimated performance of the engine/exhaust system, an estimated remaining useful life of the engine/exhaust system (e.g., measured in time or distance), a state of wear of the engine/exhaust system, or a combination thereof, based on the concentration(s) of the detected gas constituent(s). The remote device/base station controller may then instruct the user interface to present an indication (e.g., visual indication) of the estimated performance of the engine/exhaust system, the estimated remaining useful life of the engine/exhaust system, the state of wear of the engine/exhaust system, or a combination thereof. The operator of the target agricultural system and/or a technician may determine whether to repair/replace one or more components of the engine/exhaust system based on the notification, the estimated performance, the estimated remaining useful life, the state of wear, or a combination thereof. Furthermore, in certain embodiments, the controller of the remote device/base station is configured to determine an estimated cost associated with repairing or replacing the one or more components of the engine/exhaust system in response to determining that the concentration of at least one gas constituent is above the respective threshold reference concentration. In addition, the controller of the remote device/base station is configured to instruct the user interface to present the estimated cost. Furthermore, while the gas composition sensor is monitoring anhydrous ammonia, the operator/technician may be notified of leaking anhydrous ammonia if a detected anhydrous ammonia concentration is greater than a threshold reference concentration (e.g., based on the separation distance between the gas emitter and the gas composition sensor), thereby enabling the operator/technician to repair or replace the component emitting anhydrous ammonia. Due to the non-directional nature of gas emissions, the gas emitting component may be different than the target object described above. That is, the sensor assembly may not be directed toward the gas emitting component while the gas composition sensor is receiving gas from the gas emitting component.

In certain embodiments, the sensor assembly of the UAV includes an electric field and/or magnetic field sensor, such as an electrical current sensor. The electric field and/or magnetic field sensor may receive electric and/or magnetic signals from various electrical components of the target agricultural system, such as electrical wiring used in conjunction with the engine, or an electrical bus connecting the work vehicle to the agricultural implement, among other electrical components of the target agricultural system. The UAV controller, in turn, may output a signal indicative of the electric field/magnetic field sensor data to the controller of the remote device/base station (e.g., via respective transceivers). The remote device/base station controller may compare the electric and/or magnetic field(s) emitted by the electrical component to baseline/nominal electric and/or magnetic field(s) for the electrical component. The remote device/base station controller may also compare the electric and/or magnetic field(s) emitted by the electrical component to electric and/or magnetic field(s) associated with various fault conditions of the electrical component (e.g., loose connection, voltage higher or lower than target voltage, engine misfire, etc.). In addition, the remote device/base station controller may determine an estimated performance of the electrical component, an estimated remaining useful life of the electrical component (e.g., measured in time or distance), a state of wear of the electrical component, or a combination thereof, based on the electric/magnetic field comparison(s). The remote device/base station controller may also determine an estimated performance/estimated remaining useful life/state of wear of an object electrically coupled to the electrical component, such as the engine, a controller, etc. The remote device/base station controller may then instruct the user interface to present an indication (e.g., visual indication) of the estimated performance of the electrical component/connected object, the estimated remaining useful life of the electrical component/connected object, the state of wear of the electrical component/connected object, or a combination thereof. The operator of the target agricultural system and/or a technician may determine whether to repair/replace the electrical component/connected object based on the indication, the estimated performance, the estimated remaining useful life, the state of wear, or a combination thereof. Furthermore, in certain embodiments, the controller of the remote device/base station is configured to determine an estimated cost associated with repairing or replacing the electrical component/connected object (e.g., if repair or replacement is desired). In addition, the controller of the remote device/base station is configured to instruct the user interface to present the estimated cost. In certain embodiments, the sensor assembly may not be directed toward the electrical component while the electric and/or magnetic field sensor is monitoring the electrical component.

In certain embodiments, the sensor assembly of the UAV includes a particulate sensor configured receive gas emitted from the exhaust system of the work vehicle, among other components of the target agricultural system. The UAV controller, in turn, may output a signal indicative of the particulate sensor data to the controller of the remote device/base station (e.g., via respective transceivers). The remote device/base station controller may compare the concentration of particulates with the monitored gas to a threshold reference concentration for the particulates (e.g., based on the separation distance between the gas emitter and the particulate sensor), and instruct a user interface to present a notification in response to determining that the concentration of the particulates is above the threshold reference concentration. In addition, the remote device/base station controller may determine an estimated performance of the engine/exhaust system, an estimated remaining useful life of the engine/exhaust system (e.g., measured in time or distance), a state of wear of the engine/exhaust system, or a combination thereof, based on the concentration of the particulates. The remote device/base station controller may then instruct the user interface to present an indication (e.g., visual indication) of the estimated performance of the engine/exhaust system, the estimated remaining useful life of the engine/exhaust system, the state of wear of the engine/exhaust system, or a combination thereof. The operator of the target agricultural system and/or a technician may determine whether to repair/replace one or more components of the engine/exhaust system based on the notification, the estimated performance, the estimated remaining useful life, the state of wear, or a combination thereof. Furthermore, in certain embodiments, the controller of the remote device/base station is configured to determine an estimated cost associated with repairing or replacing the one or more components of the engine/exhaust system in response to determining that the concentration of particulates is above the threshold reference concentration. In addition, the controller of the remote device/base station is configured to instruct the user interface to present the estimated cost. Due to the non-directional nature of particulate emissions, the gas emitting component may be different than the target object described above. That is, the sensor assembly may not be directed toward the gas emitting component while the particulate sensor is receiving gas from the gas emitting component.

In certain embodiments, the sensor assembly of the UAV may include the acoustic sensor, the gas composition sensor, the particulate sensor, the electric field sensor, the magnetic field sensor, or a combination thereof. As previously discussed, the acoustic sensor, the gas composition sensor, the particulate sensor, the electric field sensor, the magnetic field sensor, or a combination thereof, may monitor a component of the target agricultural system while the sensor assembly is direct toward the target object (e.g., different from the monitored component). Furthermore, in certain embodiments, the UAV may be moved to a position that facilitates monitoring of a component (e.g., gas emitted from the component) by the acoustic sensor, the gas composition sensor, the particulate sensor, the electric field sensor, the magnetic field sensor, or a combination thereof. In such embodiments, the controller of the UAV may receive a first signal indicative of a position and a velocity of a reference point on the target agricultural system (e.g., target agricultural tool). The UAV controller may then determine a target point relative to the reference point that enables the sensor assembly (e.g., the acoustic sensor of the sensor assembly, the gas composition sensor of the sensor assembly, the particulate sensor of the sensor assembly, the electric field and/or magnetic field sensor of the sensor assembly, etc.) to monitor a target object (e.g., the acoustically monitored component, the gas emitting component, the electrical component, etc.) on the target agricultural system based at least in part on the position of the reference point and a position of the target object relative to the reference point. The UAV controller may output a second signal to the movement control system of the UAV indicative of instructions to move the UAV to the target point and to maintain the velocity of the reference point in response to reaching the target point. Furthermore, the UAV controller may receive a third signal from the sensor assembly indicative of data acquired by the sensor assembly.

Figure 4:
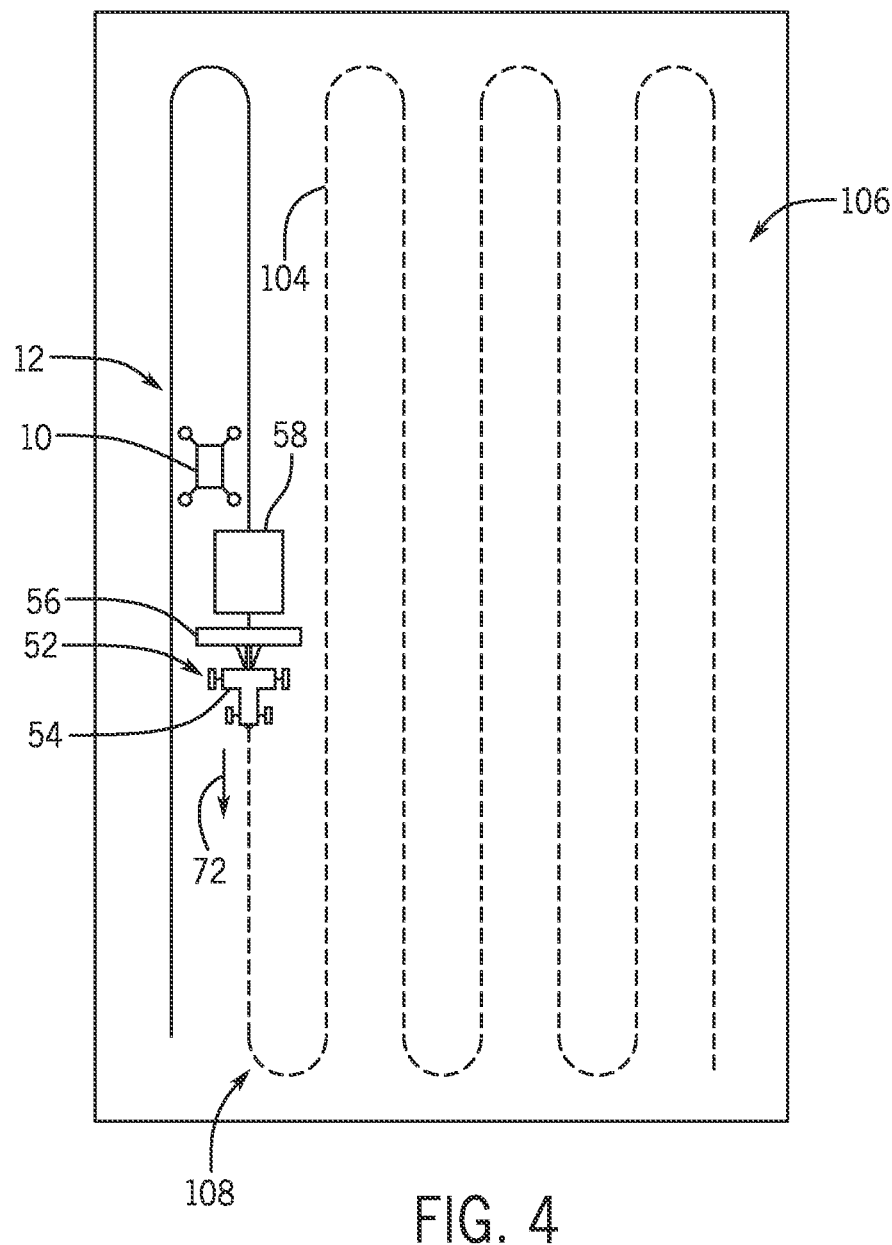
FIG. 4 is a schematic diagram of an embodiment of a UAV of an aerial monitoring system and a target agricultural system.

FIG. 4 is a schematic diagram of an embodiment of a UAV 10 of an aerial monitoring system 12 and a target agricultural system 52. As illustrated, the target agricultural system 12 is following a route 104 through the field 106. The solid lines represent a portion of the route 104 that has been traversed by the work vehicle target agricultural system 52, and the dashed lines represent a portion of the route 104 that has been planned but not traversed. The route 104 is an element of a plan that may also include routes for other agricultural systems within the field. In the illustrated embodiment, the route 104 includes multiple straight sections separated by curved headland turns. However, in other embodiments, the route may include concentric portion(s) (e.g., squares, circles, etc.), spiral portion(s) (e.g., square spiral, circular spiral, etc.), irregularly shaped portion(s), or a combination thereof (e.g., based on field conditions). In the illustrated embodiment, the target agricultural system 52 includes the work vehicle 54, the agricultural implement 56, and the air cart 58. The work vehicle 54 is towing the agricultural implement 56 and the air cart 58 along the route 104 in the direction of travel 72, thereby enabling the agricultural implement 56 to performing seeding operations. While the illustrated target agricultural system includes the work vehicle, the agricultural implement, and the air cart, in other embodiments, the target agricultural system may include other and/or additional agricultural tools (e.g., a self-contained harvester, a self-contained sprayer, a work vehicle towing a tillage tool, etc.).

As previously discussed, in certain embodiments, the controller of the UAV 10 is configured to receive a signal indicative of a position and a velocity of a reference point on a target agricultural tool (e.g., the work vehicle 54, the agricultural implement 56, or the air cart 58) of the target agricultural system 52. The UAV controller is also configured to receive a signal indicative of a position of a target object on the target agricultural tool relative to the reference point and to determine a target point relative to the reference point that provides a line-of-sight to the target object. Upon determining the target point, the UAV controller is configured to output a signal to the movement control system indicative of instructions to move to the target point and to maintain the velocity of the reference point in response to reaching the target point. In addition, the UAV controller is configured to output a signal indicative of instructions to direct the sensor assembly toward the target object and to receive a signal from the sensor assembly indicative of data acquired by the sensor assembly.

In certain embodiments, the UAV controller is configured to receive a signal (e.g., from a remote device/base station, or from the target agricultural system) indicative of the route 104 through the field 106. In such embodiments, the UAV controller is configured to adjust the target point based on the route. For example, as the target agricultural system 52 approaches a headland turn 108, the UAV controller may adjust the target point relative to the reference point (e.g., to enable the UAV to monitor the target object through the headland turn). The UAV controller may also use the route information to determine the current and/or future velocity of the target agricultural system and/or the future position of the agricultural system, thereby reducing lag in the UAV position control loop (e.g., enabling the UAV controller to provide instructions to the movement control system that enable the movement control system to position the UAV at the target point more quickly and/or accurately).

FIG. 5 is a block diagram of an embodiment of an aerial monitoring system 12 and a target agricultural tool 110. The target agricultural tool 110 may correspond to the target agricultural implement of FIG. 1, the work vehicle of FIG. 3, the agricultural implement of FIG. 3, the air cart of FIG. 3, or any other suitable agricultural tool. In the illustrated embodiment, the UAV 10 includes the movement control system 36, the sensor assembly 38, and the sensor control system 40. As previously discussed, the movement control system 36 may include one or move propellers and/or ducted fans configured to lift the UAV 10 above the surface of the soil and to control the direction of movement of the UAV 10. For example, the movement control system may be configured to tilt one or more of the propellers/ducted fans to control the direction of movement of the UAV. Additionally and/or alternatively, the movement control system may be configured to control an output power of one or more of the propellers/ducted fans to control the direction of movement of the UAV.

In the illustrated embodiment, the sensor assembly 38 includes a LIDAR system 112, an acoustic sensor 113, a thermal sensor/camera 114, a gas composition sensor 115, a visual camera 116, a particulate sensor 117, a stereoscopic camera 118, and an electric field and/or magnetic field sensor 119. As previously discussed, the LIDAR system 112 is configured to determine a point cloud corresponding to the target object and to output a signal indicative of the point cloud. In addition, the acoustic sensor 113 is configured to output a signal indicative of audio signals/sound waves emitted by a component of the target agricultural tool. The thermal (e.g., IR) sensor/camera 114 is configured to output a signal indicative of thermal (e.g., IR) emissions from the target object. The gas composition sensor 115 is configured to output a signal indicative of concentration(s) of gas component(s) emitted by a component of the target agricultural tool. Furthermore, the visual camera 116 is configured to output a signal indicative still and/or moving images of the target object in the visual spectrum, and the stereoscopic camera 118 is configured to output a signal indicative of a three-dimensional image of the target object. The particulate sensor 117 is configured to output a signal indicative of a particulate concentration within a gas emitted by a component of the target agricultural tool. Furthermore, the electric field and/or magnetic field sensor 119 is configured to output a signal indicative of a detected electric field and/or a detected magnetic field. While the illustrated sensor assembly 38 includes the LIDAR system 112, the acoustic sensor 113, the thermal (e.g., IR) sensor/camera 114, the gas composition sensor 115, the visual camera 116, the particulate sensor 117, the stereoscopic camera 118, and the electric field and/or magnetic field sensor 119, in other embodiments, the sensor assembly may include a subset of these sensors and/or other/additional sensors, such as an ultrasonic sensor, a capacitance sensor, an ultraviolet (UV) spectrum camera, or a radio detection and ranging (RADAR) system.

As illustrated, the sensor control system 40 is coupled to the sensor assembly 38 and configured to direct the sensor assembly 38 toward the target object. For example, the sensor control system 40 may include one or more actuators, such as servo motors, configured to move an assembly including all of the sensors. However, in other embodiments, each sensor or each group of sensors (e.g., of multiple sensor groups) may be coupled to respective actuator(s), thereby enabling the sensor control system to move the sensors/groups of sensors in different directions. For example, one group of sensors may be directed toward a first target object, and a second group of sensors may be directed to a second target object, thereby enabling the aerial monitoring system to monitor multiple target objects concurrently. Furthermore, in certain embodiments, the sensor control system may be omitted. In such embodiments, the sensor assembly may be oriented in a fixed position relative to the body of the UAV.

In the illustrated embodiment, the UAV 10 includes a controller 120 communicatively coupled to the movement control system 36, the sensor assembly 38, and the sensor control system 40. In certain embodiments, the controller 120 is an electronic controller having electrical circuitry configured to process data from the sensor assembly 38 and to output instructions to the movement control system 36 and the sensor control system 40. In the illustrated embodiment, the controller 120 includes a processor, such as the illustrated microprocessor 122, and a memory device 124. The controller 120 may also include one or more storage devices and/or other suitable components. The processor 120 may be used to execute software, such as software for controlling the UAV, software for processing sensor data, and so forth. Moreover, the processor 122 may include multiple microprocessors, one or more "general-purpose" microprocessors, one or more special-purpose microprocessors, and/or one or more application specific integrated circuits (ASICS), or some combination thereof. For example, the processor 122 may include one or more reduced instruction set (RISC) processors.

The memory device 124 may include a volatile memory, such as random access memory (RAM), and/or a nonvolatile memory, such as read-only memory (ROM). The memory device 124 may store a variety of information and may be used for various purposes. For example, the memory device 124 may store processor-executable instructions (e.g., firmware or software) for the processor 122 to execute, such as instructions for controlling the UAV 10, instructions for processing sensor data, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, target agricultural tool route data, etc.), instructions (e.g., software or firmware for controlling the UAV, etc.), and any other suitable data.

In the illustrated embodiment, the UAV 10 includes a spatial locating device 126 communicatively coupled to the controller 120. The spatial locating device (e.g., including a GPS antenna and a GPS receiver) is configured to determine the position and the velocity of the UAV 10 based on spatial locating signals (e.g., received from GPS satellites). In addition, the UAV 10 includes a transceiver 128 communicatively coupled to the controller 120. The transceiver 128 is configured to establish a communication link with a corresponding transceiver of a remote device/base station and/or the target agricultural tool, thereby facilitating communication between the remote device/base station and/or the target agricultural tool and the controller 120 of the UAV 10. The transceiver 128 may operate at any suitable frequency range within the electromagnetic spectrum. For example, in certain embodiments, the transceiver 128 may broadcast and receive radio waves within a frequency range of about 400 MHz to about 6 GHz. In addition, the transceiver 128 may utilize any suitable communication protocol, such as a standard protocol (e.g., Wi-Fi, Bluetooth, etc.) or a proprietary protocol.

In the illustrated embodiment, the target agricultural tool 110 includes a spatial locating antenna 42 and a spatial locating receiver 130. For example, the spatial locating antenna 42 may include a global positioning system (GPS) antenna configured to receive GPS signal from GPS satellites. In addition, the spatial locating receiver 130 (e.g., GPS receiver) is communicatively coupled to the spatial locating antenna 42 and configured to determine the position, and in certain embodiments the velocity, of the target agricultural tool 110. Furthermore, in the illustrated embodiment, the target agricultural tool 110 includes a controller 132 communicatively coupled to the spatial locating receiver 130, and a transceiver 134 communicatively coupled to the controller 132. As discussed in detail below, the controller 132 is configured to receive a position, and in certain embodiments, a velocity from the spatial locating receiver 130, and the controller 132 is configured to output a signal indicative of the position, and in certain embodiments, the velocity of the target agricultural tool 110 via the transceiver 134. The transceiver 134 is configured to establish a communication link with a corresponding transceiver of a remote device/base station and/or the UAV, thereby facilitating communication between the remote device/base station and/or the UAV and the controller 132 of the target agricultural tool 110. The transceiver 134 may operate at any suitable frequency range within the electromagnetic spectrum. For example, in certain embodiments, the transceiver 134 may broadcast and receive radio waves within a frequency range of about 400 MHz to about 6 GHz. In addition, the transceiver 134 may utilize any suitable communication protocol, such as a standard protocol (e.g., Wi-Fi, Bluetooth, etc.) or a proprietary protocol.

In certain embodiments, the controller 132 is an electronic controller having electrical circuitry configured to process data from the spatial locating receiver 130 and to output data to the transceiver 134. The controller 132 may also control multiple functions of the target agricultural tool 110, such as position(s) of element(s) coupled to a frame of the target agricultural tool (e.g., based on feedback from sensors communicatively coupled to the controller). In the illustrated embodiment, the controller 132 includes a processor, such as the illustrated microprocessor 136, and a memory device 138. The controller 132 may also include one or more storage devices and/or other suitable components. The processor 136 may be used to execute software, such as software for controlling the target agricultural tool, software for outputting position/velocity data, and so forth. Moreover, the processor 136 may include multiple microprocessors, one or more "general-purpose" microprocessors, one or more special-purpose microprocessors, and/or one or more application specific integrated circuits (ASICS), or some combination thereof. For example, the processor 136 may include one or more reduced instruction set (RISC) processors.

The memory device 138 may include a volatile memory, such as random access memory (RAM), and/or a nonvolatile memory, such as read-only memory (ROM). The memory device 138 may store a variety of information and may be used for various purposes. For example, the memory device 138 may store processor-executable instructions (e.g., firmware or software) for the processor 136 to execute, such as instructions for controlling the target agricultural tool 110, instructions for outputting position/velocity data, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, target agricultural tool route data, etc.), instructions (e.g., software or firmware for controlling the target agricultural tool, etc.), and any other suitable data.

In the illustrated embodiment, the target agricultural tool 110 includes a first target object 140, a second target object 142, a third target object 144, and a fourth target object 146. While the illustrated target agricultural tool 110 has four target objects, in other embodiments, the target agricultural tool may have more or fewer target objects (e.g., 1, 2, 10, 20, 30, or more). As previously discussed, each target object may correspond to a tire, a disc blade, a tillage point, a finishing reel, a bearing, a cab seal, a motor, or any other suitable object within the target agricultural tool 110 (e.g., belt, chain, power takeoff (PTO) shaft, etc.). As illustrated by the dashed lines, a position of each target object may be defined relative to a reference point 148. For example, the position of each target object may be represented as an offset along a lateral axis 150, an offset along a longitudinal axis 152, and an offset along a vertical axis relative to the reference point 148. However, in other embodiments, other coordinate systems may be used to represent the position of each target object relative to the reference point 148. In the illustrated embodiment, the reference point corresponds to the location of the spatial locating antenna 42 on the target agricultural tool 110. Accordingly, the position of the reference point on the target agricultural tool corresponds to the position of the spatial locating antenna 42 relative to a global coordinate system. While the location of the reference point on the target agricultural tool corresponds to the location of the spatial locating antenna in the illustrated embodiment, in other embodiments, the location of the reference point may be offset (e.g., along the lateral axis 150 and/or along the longitudinal axis 152) from the spatial locating antenna.

In the illustrated embodiment, the aerial monitoring system 12 includes a remote device/base station 154 configured to communicate with the UAV 10 and to provide information to an operator/technician. The remote device/base station may be a portable electronic device, such as a cell phone or tablet, or the remote device/base station may be a fixed electronic device, such as a computer or server. The remote device/base station may be located within the same field as the UAV, or the remote device/base station may be located remote from the field, such as within a control room or a dealership. In the illustrated embodiment, the remote device/base station 154 includes a controller 156, a user interface 158, and a transceiver 160. As illustrated, the controller 156 is communicatively coupled to the user interface 158 and to the transceiver 160. The transceiver 160 is configured to establish a communication link with a corresponding transceiver of a target agricultural tool and/or the UAV, thereby facilitating communication between the target agricultural tool and/or the UAV and the controller 156 of the remote device/base station 154. The transceiver 160 may operate at any suitable frequency range within the electromagnetic spectrum. For example, in certain embodiments, the transceiver 160 may broadcast and receive radio waves within a frequency range of about 400 MHz to about 6 GHz. In addition, the transceiver 160 may utilize any suitable communication protocol, such as a standard protocol (e.g., Wi-Fi, Bluetooth, etc.) or a proprietary protocol.

In certain embodiments, the controller 156 is an electronic controller having electrical circuitry configured to process data from the transceiver 160 and to output data to the user interface 158. In the illustrated embodiment, the controller 156 includes a processor, such as the illustrated microprocessor 162, and a memory device 164. The controller 156 may also include one or more storage devices and/or other suitable components. The processor 162 may be used to execute software, such as software for determining a state of wear of a target object, software for determining an estimated cost to repair or replace the target object, and so forth. Moreover, the processor 162 may include multiple microprocessors, one or more "general-purpose" microprocessors, one or more special-purpose microprocessors, and/or one or more application specific integrated circuits (ASICS), or some combination thereof. For example, the processor 162 may include one or more reduced instruction set (RISC) processors.

The memory device 164 may include a volatile memory, such as random access memory (RAM), and/or a nonvolatile memory, such as read-only memory (ROM). The memory device 164 may store a variety of information and may be used for various purposes. For example, the memory device 164 may store processor-executable instructions (e.g., firmware or software) for the processor 162 to execute, such as instructions for determining a state of wear of the target object, instructions for determining an estimated cost to repair or replace the target object, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, target agricultural tool route data, etc.), instructions (e.g., software or firmware for determining a state of wear of the target object, etc.), and any other suitable data.

In the illustrated embodiment, the user interface 158 includes a display 166. The display 166 is configured to present information to the user/operator, such as an image of the target object and/or a notification regarding the state of wear of the target object. In certain embodiments, the display 166 may be a touch screen display configured to receive input from the user/operator.

In certain embodiments, the UAV controller 120 may receive a signal indicative of a position of the reference point 148 on the target agricultural tool 110. For example, the target agricultural tool controller 132 may determine the position of the reference point based a signal from the spatial locating receiver 130. The signal indicative of the position of the reference point may then be output from the target agricultural tool controller 132 to the UAV controller 120 via the target agricultural tool transceiver 134 and the UAV transceiver 128. In further embodiments, the signal indicative of the position of the reference point may be output to the remote device/base station controller 156 via the target agricultural tool transceiver 134 and the remote device/base station transceiver 160, and the signal indicative of the position of the reference point may be output from the remote device/base station controller 156 to the UAV controller 120 via the remote device/base station transceiver 160 and the UAV transceiver 128. Next, the UAV controller 120 may receive a signal indicative of a position of the target object (e.g., the first target object 140) relative to the reference point. The signal indicative of the position of the target object relative to the reference point may be received from the target agricultural tool controller 132 (e.g., via the target agricultural tool transceiver 134 and the UAV transceiver 128) or from the remote device/base station controller 156 (e.g., via the remote device/base station transceiver 160 and the UAV transceiver 128). For example, the position of each target object relative to the reference point may be stored in the memory of the target agricultural tool controller and/or in the memory of the remote device/base station controller. In further embodiments, the position of the target object relative to the reference point may be stored in the memory of the UAV controller. For example, the UAV controller may store the position of each target object on multiple agricultural tools. The UAV controller may then access the position of each target object on the target agricultural tool upon identification of the target agricultural tool (e.g., via visual identification, via a signal output by the target agricultural tool transceiver, etc.).

The UAV controller 120 may determine a target point relative to the reference point 148 that provides a line-of-sight to the target object (e.g., the first target object 140). In certain embodiments, the target point is determined based on a model of the target agricultural implement. For example, determining a target point positioned directly above the reference point may not establish a line-of-sight to the target object due to an obstruction (e.g., structural member of the target agricultural implement) being positioned between the target point and the target object. Accordingly, the model of the target agricultural implement may be used to determine a target point of the UAV that establishes a line-of-sight between the sensor assembly and the target object e.g., by establishing a line-of-sight that does not intersect an obstruction on the agricultural implement). The model may be stored within the memory 124 of the UAV controller 120 or within a storage device, for example.

Upon determining the target point, the UAV controller 120 may output a signal to the movement control system 36 indicative of instructions to move the UAV 10 to the target point. For example, the UAV controller 120 may determine the current location of the UAV 10 based on input from the spatial locating device 126, determine a path of the target point, and maintain a position at the target point (e.g., in which the current position corresponds to the target point). Upon reaching the target point, the UAV controller 120 may output a signal to the sensor control system 40 indicative of instructions to direct the sensor assembly 38 toward the target object. However, in other embodiments, the sensor control system may be omitted, and the orientation of the sensor assembly may be fixed to the body of the UAV. In such embodiments, the UAV controller may not output the signal indicative of instruction to direct the sensor assembly toward the target object. In certain embodiments, the LIDAR system 112 of the sensor assembly 38 is configured to output a signal to the UAV controller 120 indicative of a point cloud corresponding to the target object. The UAV controller 120 may receive the signal indicative of the point cloud and output a corresponding signal to the remote device/base station controller 156 (e.g., via the UAV transceiver 128 and the remote device/base station transceiver 160).

The remote device/base station controller 156 may receive the signal from the UAV controller 120 indicative of the point cloud corresponding to the target object. The remote device/base station controller 156 may then compared the point cloud to a model of the target object in a reference unworn state. For example, the target object may be manufactural based on an engineering model (e.g., developed using engineering CAD software). The point cloud may be compared to the original engineering model of the part to determine wear. In certain embodiments, a state of wear of target object (e.g., represented as a percentage) may be determine based on the comparison between the point cloud and the model of the target object. In certain embodiments, the controller 156 may instruct the user interface 158 (e.g., the display 166 of the user interface 158) to present a visual representation of the state of wear (e.g., a graph showing the state of wear, an overlay of the model on the point cloud, etc.) and/or a numerical representation of the state of wear (e.g., the percent of wear). The state of wear may also be sent to a cell phone (e.g., of an owner and/or technician) via the transceiver 160 or another suitable device (e.g., cellular network transceiver). In certain embodiments, the controller 156 may determine performance of the target object based on the state of wear and usage (e.g., measured in time, measured in distance, etc.). For example, the controller 156 may determine that the target object is performing well if the state of wear is less than an average state of wear for objects that experienced similar usage. In addition, the controller 156 may determine that the target object is performing poorly if the state of wear is greater than the average state of wear for objects that experienced similar usage. The controller 156 may instruct the user interface 158 (e.g., the display 166 of the user interface 158) to present an indication of the performance of the target object.

While the comparison between monitored target object and the model of the target object in the reference unworn state is performed using a point cloud, in other embodiments, the comparison may be based on one or more 2D and/or 3D images of the target object. For example, the stereoscopic camera 118 may output a signal indicative of a 3D image of the target object, and the remote device/base station controller 156 may compare the 3D image of the target object to the model to determine the state of wear. Furthermore, the visual camera 116 and/or the thermal/IR sensor/camera 114 may output signal(s) indicative of one or more 2D images of the target object, and the remote device/base station controller 156 may compare the 2D image(s) of the target object to the model to determine the state of wear. In certain embodiments, the thermal/IR sensor/camera may be a stereoscopic sensor/camera. In such embodiments, the thermal/IR sensor/camera may output a signal indicative of a 3D image of the target object, and the remote device/base station controller may compared the 3D image of the target object to the model to determine the state of wear. In certain embodiments, the remote device/base station controller may fuse the 2D/3D image(s) with the point cloud to establish a model of the target object in the worn state, which may be compared to the model of the target object in the reference unworn state to determine the state of wear.

Upon determining the state of wear of the target object, the remote device/base station controller 156 may determine an estimated cost to repair or replace the target object based on the state of wear. Additionally or alternatively, the remote device/base station controller 156 may determine a value of the target agricultural tool based on the state of wear. The remote device/base station controller 156 may then instruct the user interface 158 (e.g., the display 166 of the user interface) to present the estimated cost to repair or replace the target object and/or the value of the target agricultural implement to the user/operator. For example, the remote device/base station controller 156 may determine whether to repair or replace the target object based on the state of wear. For example, if the state of wear is below a threshold, the control system may select a repair, and if the state of wear is above the threshold, the control system may select replacement. If a repair is selected, the controller 156 may determine the repair cost based on the cost of replacement parts and the labor cost associated with installing the replacement parts. For example, a lower state of wear may be less expensive to repair than a higher state of wear due utilization of fewer replacement parts and/or less labor associated with installation of the replacement parts. Furthermore, if replacement is selected, the controller 156 may determine the replacement cost based on the cost of replacing the entire target object. In certain embodiments, the controller 156 may determine the value of the target agricultural implement based on the state of wear of the target object. For example, the value of the target object may be determined based on a price of a used target object having the determined state of wear (e.g., using a database of object values, an empirical formula, etc.). The value of the target object may then be added to the value of the remainder of the target agricultural implement (e.g., determined based at least in part on previous valuations of other target objects) to determine the value of the target agricultural tool.

Once repair/replacement cost and/or the value of the agricultural implement is determined and presented to the operator, the process described above may be repeated for another target object on a list of candidate target objects (e.g., including the first target object 140, the second target object 142, the third target object 144, and the fourth target object 146). Accordingly, in certain embodiments, the repair/replacement cost of each target object on the target agricultural implement may be determined. In addition, in certain embodiments, the value of each target object on the agricultural implement may be determined. These values may be added to one another to determine the total value of the target objects. The total value of the target objects may be added to the value of the remainder of the target agricultural implement to determine the total value of the agricultural implement. In certain embodiments, the total repair/replacement cost may be compared to the total value of the target agricultural implement to facilitate determination of whether to repair/replace target objects, to sell the agricultural implement, or a combination thereof. For example, the controller 156 may determine that repairing/replacing a portion of the target objects may provide an increase in value of the target agricultural implement greater than the repair/replacement costs of the portion of the target objects. Accordingly, the controller 156 may recommend repairing/replacing the portion of the target objects to increase the total return the owner of the target agricultural implement will receive upon selling the target agricultural implement.

In certain embodiments, the aerial monitoring system 12 is configured to monitor the target objects during operation of the target agricultural tool 110. In the illustrated embodiment, the UAV controller 120 is configured to receive a signal indicative of a position and a velocity of the reference point 148 on a target agricultural tool 110. The signal indicative of the position and the velocity of the reference point 148 may be output from the target agricultural tool controller 132 to the UAV controller 120 (e.g., via the target agricultural tool transceiver 134 and the UAV transceiver 128). The UAV controller 120 may also receive a signal indicative of a position of a target object on the target agricultural tool relative to the reference point (e.g., from the target agricultural tool controller 132 via the target agricultural tool transceiver 134 and the UAV transceiver 128). The UAV controller 120 may then determine a target point relative to the reference point 148 that provides a line-of-sight to the target object. The position of the target point may be adjusted through a turn of the target agricultural tool 110 (e.g., rotation of the target agricultural tool about the vertical axis). For example, as the target agricultural tool 110 turn, the position of the target point may be adjusted such that the relative position of the UAV to the target object remains substantially constant.

Upon determining the target point, the UAV controller 120 may output a signal to the movement control system 36 of the UAV 10 indicative of instructions to move to the target point and to maintain the velocity of the reference point 148 in response to reaching the target point. Upon reaching the target point and maintaining the velocity of the reference point 148, the UAV controller 120 may output a signal to the sensor control system 40 indicative of instructions to direct the sensor assembly 38 toward the target object. As previously discussed, the sensor control system 40 may include one or more actuators configured to control a direction of the sensor assembly relative to a body of the UAV. Once the sensor assembly 38 is directed toward the target object, the sensor assembly may monitor the target object and output a signal to the UAV controller 120 indicative of data acquired by the sensor assembly 38. In the illustrated embodiment, the sensor assembly 38 includes the thermal (e.g., IR) sensor/camera 114 configured to output a signal indicative of thermal (e.g., IR) emissions from the target object.

The UAV controller 120 is configured to receive the signal from the thermal (e.g., IR) sensor/camera 114 and to output a corresponding signal indicative of the thermal (e.g., IR) emissions data to a remote device/base station controller 156 (e.g., via the UAV transceiver 128 and the remote device/base station transceiver 160). The remote device/base station controller 156 may determine a temperature profile of the target object based on the signal. For example, the remote device/base station controller 156 may determine a maximum temperature of the target object, an average temperature of the target object, a temperature of certain portion(s) of the target object, or a combination thereof. In certain embodiments, the controller 156 may compare the temperature (e.g., average temperature, maximum temperature, etc.) of the target object to a threshold reference temperature. The remote device/base station controller 156 may then instruct the user interface 158 (e.g., the display 166 of the user interface 158) to present a notification in response to determining that the temperature is above the threshold reference temperature. In certain embodiments, the notification may be customized by the user/operator (e.g., color(s), font(s), shape(s), size(s), sound(s), of the notification may be selected). The notification may also be sent to a cell phone (e.g., of an owner, a manager, a technician, etc.) via the transceiver 160 or another suitable device (e.g., cellular network transceiver). Furthermore, in certain embodiments, the controller 156 is configured to instruct the user interface 158 (e.g., the display 166 of the user interface 158) to present an image of the target object based on the data (e.g., thermal/IR emissions) data received by the sensor assembly 38. The image may enable the user/operator to identify portions of the target object having a higher temperature.

In certain embodiments, the remote device/base station controller 156 is configured to determine an estimated cost associated with repairing or replacing the target object in response to determining that the temperature of the target object is above the threshold reference temperature. In addition, the controller 156 is configured to instruct the user interface to present the estimated cost. If the maximum temperature or the average temperature of the target object is above the threshold reference temperature, the target object may not be working efficiently. For example, if the average temperature of a bearing is greater than the threshold reference temperature associated with the bearing, the bearing may not be functioning effectively. Accordingly, the remote device/base station controller 156 may automatically determine the cost of repairing or replacing the bearing to enable an operator, owner, or technician to determine whether the cost of replacing the target object is justified for the state of wear of the target object.

In certain embodiments, the remote device/base station controller 156 may recommend a maintenance action in response to determining that the temperature of the target object is above a threshold temperature. For example, if the temperature of the target object is above a first threshold temperature, the controller 156 may recommend a maintenance action, and if the temperature of the target object is above a second threshold temperature, higher than the first threshold temperature, the controller 156 may instruct the user interface 158 to present a notification and/or determine an estimated cost associated with repairing or replacing the target object. The maintenance operator may include applying grease, making an adjustment, another suitable action, or a combination thereof. After the maintenance operation is performed, the controller 156 may determine whether the operation was successful (e.g., during subsequent field operations). If the maintenance operation is not successful (e.g., the temperature of the target object increases, remains the same, or does not decrease below the first threshold temperature), the controller 156 may recommend performing a stationary inspection of the target object (e.g., using the LIDAR system of the UAV, as described above with reference to FIG. 1).

In certain embodiments, the target agricultural tool 110 includes one or more sensors configured to monitor operation of the target agricultural tool. For example, the target agricultural tool 110 may include one or more airflow sensors configured to monitor airflow rate(s) through one or more lines of a pneumatic system, such as the pneumatic distribution system described above with reference to FIG. 3 (e.g., including the air source, the plenum, the primary line(s), the header(s), and the secondary line(s)). The sensors may be communicatively coupled to the target agricultural tool controller 132 and configured to output signal(s) indicative of respective airflow rate(s) to the controller 132. In certain embodiments, the target agricultural tool controller 132 may output corresponding signal(s) indicative of the airflow rate(s) to the UAV controller 120 (e.g., via the target agricultural tool transceiver 134 and the UAV transceiver 128). The UAV controller 120, in turn, may output the signal(s) indicative of the airflow rate(s) to the remote device/base station controller 156 (e.g., via the UAV transceiver 128 and the remote device/base station transceiver 160). The remote device/base station controller 156 may identify blocked lines, insufficient flow rate(s), excessive flow rate(s), other condition(s) associated with operation of the pneumatic system, or a combination thereof, based on the signal(s). The remote device/base station controller 156 may then instruct the user interface 158 (e.g., the display 166 of the user interface 158) to inform the user/operator of the detected condition(s). In addition, the remote device/base station controller 156 may instruct the display 166 of the user interface 158 to present a graphical representation of the airflow rate(s) within the pneumatic system. While airflow sensors are described above, the UAV may convey other sensor data from the target agricultural tool to the remote device/base station, such as data from position sensor(s), angle sensor(s), ultrasonic sensor(s), camera(s), proximity sensor(s), non-contact soil sensor(s), other suitable sensor(s), or a combination thereof. Furthermore, in certain embodiments, at least one sensor may include an integrated transceiver, thereby enabling the sensor to communicate directly with the UAV transceiver. In such embodiments, the UAV may be instructed to move to position(s) that facilitate reception of the signal(s) from the sensor(s).

In certain embodiments, certain functions described above as being performed by one controller may be performed by another controller. For example, in certain embodiments, the remote device controller may determine the target point relative to the reference point that provides a line-of-sight to the target object. In such embodiments, the remote device controller may output a signal indicative of the target point to the UAV controller (e.g., via respective transceivers). Furthermore, in certain embodiments, the comparison between the point cloud and the model of the target object in a reference unworn state and the determination of the state of wear of the target object based on the comparison may be performed by the UAV controller. In such embodiments, the UAV controller may output the state of wear to the remote device/base station controller (e.g., via respective transceivers). In addition, in certain embodiments, the remote device/base station may be integrated with the target agricultural tool, such that the target agricultural tool controller performs the above-described functions associated with the remote device/base station controller. In such embodiments, the target agricultural tool may include a user interface (e.g., having a display) configured to present information to the user/operator of the target agricultural tool.

In addition, while the transceivers are configured to communicate directly with one another in the illustrated embodiment, in other embodiments, certain signals may be sent from one transceiver to another transceiver via a cloud, a wireless network, remote server, or a combination thereof. In embodiments that include a remote server, the remote server may perform one or more functions described above as being performed by the UAV controller, the target agricultural tool controller, or the remote device/base station controller. Furthermore, in embodiments that include a cloud and/or wireless network, other device(s) and/or system(s) may be communicatively coupled to the cloud/wireless network, thereby enabling the device(s)/system(s) to access certain data from the aerial monitoring system. For example, an implement dealer, a farm manager, and/or an authorized third party may access data associated with monitoring the target object(s) (e.g., notification(s), state(s) of wear, repair or replacement cost(s), etc.). In addition, vehicle-to-vehicle and/or implement-to-implement comparisons may be performed within a fleet of vehicle(s)/implement(s) (e.g., comparison of object wear, comparison of object temperature profiles, etc.), and the results of the comparison may be distributed to the operator/owner/manager.

In certain embodiments, the UAV 10 of the aerial monitoring system 12 may be configured to monitor field conditions. For example, the UAV may include an acoustical sensor (e.g., an acoustical backscattering sensor) configured to monitor soil conditions (e.g., soil density, soil moisture content, etc.). The UAV controller may output a signal indicative of the soil conditions to the remote device/base station controller and/or to the target agricultural tool controller (e.g., to inform the user/operator of the field conditions and/or to facilitate automatic control of the target agricultural tool). In addition, the UAV 10 of the aerial monitoring system 12 may be configured to monitor the soil behind ground engaging tool(s) of the target agricultural tool 110. For example, the UAV may be instructed to direct the LIDAR system to a region of the soil behind one or more ground engaging tool(s). The UAV controller may output a signal indicative of a point cloud of the region to the remote device/base station controller. The remote device/base station controller, in turn, may determine a soil profile based on the signal, compare the soil profile to a target soil profile, and instruct the user interface (e.g., the display of the user interface) to inform the user/operator if the difference between the soil profile and the target soil profile is greater than a threshold difference. The remote device/base station controller may also instruct the display of the user interface to present a visual representation of the soil profile. While determining the soil profile based on data from the LIDAR system is described above, the soil profile may also be determined based on data from the thermal sensor/camera, the stereoscopic camera, the visual camera, other suitable sensor(s), or a combination thereof.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An aerial monitoring system for agricultural equipment, comprising:
    an unmanned aerial vehicle (UAV) comprising a movement control system, a sensor assembly, a sensor control system, and a controller, wherein the controller is communicatively coupled to the movement control system, the sensor assembly, and the sensor control system, the controller comprises a memory and a processor, and the controller is configured to:
    receive a first signal indicative of a position and a velocity of a reference point on a target agricultural tool;
    determine a target point relative to the reference point on the target agricultural tool that provides a line-of-sight to a target object on the target agricultural tool based at least in part on the position of the reference point on the target agricultural tool and a position of the target object on the target agricultural tool relative to the reference point on the target agricultural tool, wherein the target object is one of a plurality of candidate target objects on the target agricultural tool;
    output a second signal to the movement control system of the UAV indicative of instructions to move the UAV to the target point and to maintain the velocity of the reference point in response to reaching the target point;
    output a third signal to the sensor control system indicative of instructions to direct the sensor assembly toward the target object; and
    receive a fourth signal from the sensor assembly indicative of data acquired by the sensor assembly.

2. The aerial monitoring system of claim 1, wherein the sensor assembly comprises a thermal sensor or camera.

3. The aerial monitoring system of claim 1, wherein the UAV comprises a transceiver communicatively coupled to the controller, and the transceiver is configured to output a fifth signal indicative of the data acquired by the sensor assembly.

4. The aerial monitoring system of claim 3, comprising a remote device having a transceiver, a controller, and a user interface, wherein the controller of the remote device comprises a memory and a processor, and the transceiver of the remote device is configured to receive the fifth signal from the transceiver of the UAV and to output a sixth signal indicative of the data acquired by the sensor assembly to the controller of the remote device.

5. The aerial monitoring system of claim 4, wherein the controller of the remote device is configured to determine a temperature of the target object based on the data acquired by the sensor assembly, to compare the temperature of the target object to a threshold reference temperature, and to instruct the user interface to present a notification in response to determining that the temperature of the target object is above the threshold reference temperature.

6. The aerial monitoring system of claim 5, wherein the controller of the remote device is configured to determine an estimated cost associated with repairing or replacing the target object in response to determining that the temperature of the target object is above the threshold reference temperature, and the controller of the remote device is configured to instruct the user interface to present the estimated cost.

7. The aerial monitoring system of claim 4, wherein the controller of the remote device is configured to instruct the user interface to present an image of the target object based on the data acquired by the sensor assembly.

8. The aerial monitoring system of claim 1, wherein the controller of the UAV is configured to receive a seventh signal indicative of a route of the target agricultural tool, and the controller of the UAV is configured to adjust the target point based on the route.

9. The aerial monitoring system of claim 1, wherein the controller of the UAV is configured to receive an eighth signal indicative of the position of the target object relative to the reference point.

10. One or more tangible, non-transitory, machine-readable media comprising instructions configured to cause a processor of a controller of an unmanned aerial vehicle (UAV) to:
    receive a first signal indicative of a position and a velocity of a reference point on a target agricultural tool;
    determine a target point relative to the reference point on the target agricultural tool that provides a line-of-sight to a target object on the target agricultural tool based at least in part on the position of the reference point on the target agricultural tool and a position of the target object on the target agricultural tool relative to the reference point on the target agricultural tool, wherein the target object is one of a plurality of candidate target objects on the target agricultural tool;

control a movement control system of the UAV indicative of instructions to move the UAV to the target point and to maintain the velocity of the reference point in response to reaching the target point;

control a sensor control system indicative of instructions to direct a sensor assembly toward the target object; and receive a fourth second signal from the sensor assembly indicative of data acquired by the sensor assembly.

11. The one or more tangible, non-transitory, machine-readable media of claim 10, wherein the instructions are configured to cause the processor to receive a third signal indicative of a route of the target agricultural tool and to adjust the target point based on the route.

12. The one or more tangible, non-transitory, machine-readable media of claim 10, wherein the sensor assembly comprises an infrared sensor.

13. The one or more tangible, non-transitory, machine-readable media of claim 10, wherein the instructions are configured to cause the processor to receive a fourth signal indicative of the position of the target object relative to the reference point.

14. An aerial monitoring system for agricultural equipment, comprising: an unmanned aerial vehicle (UAV) comprises a movement control system, a sensor assembly, a sensor control system, and a controller, wherein the controller of the UAV is communicatively coupled to the movement control system, the sensor assembly, and the sensor control system, and the controller of the UAV comprises a memory and a processor; and a base station comprising a controller and a user interface, wherein the controller of the base station comprises a memory and a processor, and the controller of the base station is configured to:

receive a first signal from the controller of the UAV indicative of a point cloud corresponding to a target object on a target agricultural tool;

compare the point cloud to a model of the target object in a reference unworn state; determine a state of wear of the target object based on the comparison;

determine an estimated cost to repair or replace the target object, determine a value of the target agricultural tool, or a combination thereof, based on the state of wear of the target object; and instruct the user interface to present the estimated cost to repair or replace the target object, the value of the target agricultural tool, or a combination thereof;

wherein the controller of the UAV is configured to:

receive a second signal indicative of a position of a reference point on the target agricultural tool;

determine a target point relative to the reference point on the target agricultural tool that provides a line-of-sight to a target object on the target agricultural tool based at least in part on the position of the reference point on the target agricultural tool and a position of the target object on the target agricultural tool relative to the reference point on the target agricultural tool, wherein the target object is one of a plurality of candidate target objects on the target agricultural tool;

output a fourth signal to the movement control system indicative of instructions to move the UAV to the target point;

output a fifth signal to the sensor control system indicative of instructions to direct the sensor assembly toward the target object; and receive a sixth signal from the sensor assembly indicative of the point cloud corresponding to the target object.

15. The aerial monitoring system of claim 14, wherein the controller of the base station is configured to instruct the user interface to present a visual representation of the state of wear, a numerical representation of the state of wear, or a combination thereof.

16. The aerial monitoring system of claim 14, wherein the controller of the base station is configured to generate a rendered image based on the point cloud, and the controller of the base station is configured to instruct the user interface to present the rendered image.

17. The aerial monitoring system of claim 14, wherein the sensor assembly comprises a LIDAR system configured to determine the point cloud corresponding to the target object.

18. The aerial monitoring system of claim 14, wherein the controller of the UAV is configured to receive a seventh signal indicative of the position of the target object relative to the reference point.

* * * * *